(12) United States Patent
Zhu et al.

(10) Patent No.: US 11,989,829 B2
(45) Date of Patent: May 21, 2024

(54) GENERATING GEOLOGICAL FACIES MODELS WITH FIDELITY TO THE DIVERSITY AND STATISTICS OF TRAINING IMAGES USING IMPROVED GENERATIVE ADVERSARIAL NETWORKS

(71) Applicant: Schlumberger Technology Corporation, Sugar Land, TX (US)

(72) Inventors: Lingchen Zhu, Medford, MA (US); Tuanfeng Zhang, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 197 days.

(21) Appl. No.: 17/753,617

(22) PCT Filed: Sep. 14, 2020

(86) PCT No.: PCT/US2020/050656
§ 371 (c)(1),
(2) Date: Mar. 9, 2022

(87) PCT Pub. No.: WO2021/051050
PCT Pub. Date: Mar. 18, 2021

(65) Prior Publication Data
US 2022/0335689 A1    Oct. 20, 2022

Related U.S. Application Data

(60) Provisional application No. 62/899,244, filed on Sep. 12, 2019, provisional application No. 62/899,579, filed on Sep. 12, 2019.

(51) Int. Cl.
*G06T 17/05* (2011.01)
*G06N 3/045* (2023.01)
*G06N 3/088* (2023.01)

(52) U.S. Cl.
CPC ............ *G06T 17/05* (2013.01); *G06N 3/045* (2023.01); *G06N 3/088* (2013.01)

(58) Field of Classification Search
CPC ......... G06N 3/088; G06N 3/045; G06T 17/05
See application file for complete search history.

(56) References Cited

U.S. PATENT DOCUMENTS

2018/0322366 A1* 11/2018 Lim ................... G06F 18/2155
2019/0087730 A1*  3/2019 Saito ..................... G06N 3/088
(Continued)

OTHER PUBLICATIONS

Arjovsky et al., (2017) Wasserstein GAN, Dec. 6, 2017, (32 pages).
(Continued)

*Primary Examiner* — William A Beutel
(74) *Attorney, Agent, or Firm* — Jeffrey D. Frantz

(57) ABSTRACT

Neural network systems and related machine learning methods for geological modeling are provided that employ an improved generative adversarial network including a generator neural network and a discriminator neural network. The generator neural network is trained to map a combination of a noise vector and a category code vector as input to a simulated image of geological facies. The discriminator neural network is trained to map at least one image of geological facies provided as input to corresponding probability that the at least one image of geological facies provided as input is a training image of geological facies or a simulated image of geological facies produced by the generator neural network.

20 Claims, 21 Drawing Sheets

(56) References Cited

U.S. PATENT DOCUMENTS

| | | | |
|---|---|---|---|
| 2019/0147333 A1 | 5/2019 | Kallur Palli Kumar et al. | |
| 2020/0183047 A1* | 6/2020 | Denli | G06N 20/20 |
| 2020/0394475 A1* | 12/2020 | Akhazhanov | G06N 3/084 |
| 2021/0165937 A1 | 6/2021 | Bailey et al. | |
| 2021/0165938 A1 | 6/2021 | Bailey et al. | |

OTHER PUBLICATIONS

Chan and Elsheikh. Parametrization and Generation of Geological Models with Generative Adversarial Networks. Apr. 9, 2019 (26 pages).

Chen et al., "InfoGAN: Interpretable Representation Learning by Information Maximizing Generative Adversarial Nets", In NIPS, 2016. (9 pages).

Dupont et al., Generating Realistic Geology Conditioned on Physical Measurements with Generative Adversarial Networks. arXiv preprint arXiv:1802.03065, 2018 (8 pages).

Goodfellow et al., Generative adversarial nets. In Advances in neural information processing systems, 2014 (9 pages).

Gulrajani et al., "Improved Training of Wasserstein GANs", In NIPS, 2017. (19 pages).

Holden et al., Modeling of fluvial reservoirs with object models. Mathematical Geology, 30(5):473-496, 1998.

Laloy et al., Training-image based geostatistical inversion using a spatial Generative Adversarial Neural Network. Water Resources Research 54, 381-406, 2017.

Li et al., Context-aware semantic inpainting. arXiv:1712.07778, 2017 (12 pages).

Mosser et al., Reconstruction of three-dimensional porous media using generative adversarial neural networks. Physical Review E, 96(4):043309, 2017. (17 pages).

Pathak et al., Context encoders: Feature learning by inpainting. In Proceedings of the IEEE Conference on Computer Vision and Pattern Recognition. 2536-2544, 2016.

Radford et al., Unsupervised representation learning with deep convolutional generative adversarial networks. arXiv:1511.06434, 2015 (15 pages).

Skorstad et al., Well conditioning in a fluvial reservoir model, Mathematical Geology, 31(7):857-872, 1999.

Wei et al., "Improving the Improved Training of Wasserstein GANs: A Consistency Term and Its Dual Effect", International Conference on Learning Representations (ICLR), 2018. (17 pages).

Yeh et al., Semantic image inpainting with perceptual and contextual losses. arXiv:1607.07539, 2016. (10 pages).

Zhang et al., Generating geologically realistic 3D reservoir facies models using deep learning of sedimentary architecture with generative adversarial networks. Petroleum Science, https://doi.org/10.1007/s12182-019-0328-4, 2019.(10 pages).

Zhang et al., Normalized Direction-preserving Adam. arXiv:1709.04546, 2018. (12 pages).

Johnson et al., (2016) Perceptual losses for real-time style transfer and super-resolution (18 pages).

Zhu et al., (2018) Unpaired image-to-image translation using cycle-consistent adversarial networks (18 pages).

Karras et al (2018) Progressive growing of gans for improved quality, statility, and variation (26 pages).

Deutsch et al., 1998, Gslib: Geostatistical software library and users guide. Oxford University Press: 369 pages.

International Search Report and Written Opinion issued in PCT Application PCT/US2020/050656, dated Dec. 23, 2020 (10 pages).

Jichao Zhang et al., ST-GAN: Unsupervised Facial Image Semantic Transformation Using Generative Adversarial Networks, In: Proceedings of Machine Learning Research PMLR 2017, vol. 77, pp. 248-263, Nov. 17, 2017.

Hamid Eghbal-Zadeh et al., Likelihood Estimation for Generative Adversarial Networks, arXiv: I707.07530vl, Jul. 24, 2017 (9 pages).

Dario A. B. Oliveira et al., Interpolating Seismic Data With Conditional Generative Adversarial Networks, In: IEEE Geoscience and Remote Sensing Letters, vol. 15, No. 12, Sep. 14, 2018, (5 pages).

Ning Wang et al., Unsupervised Classification of Street Architectures Based on InfoGAN, arXiv: 1905.12844vl, May 30, 2019 (6 pages).

International Preliminary Report on Patentability issued in PCT Application PCT/US2020/050656, dated Mar. 24, 2022 (6 pages).

* cited by examiner

| Generator | Discriminator | Classifier |
|---|---|---|
| • Input layer latent variable with size 100 + 3 categorical codes<br>• Linear 103x10384<br>• BatchNormalization + LeakyReLU<br>• Reshape 10,384 vectors to 16x16x64 features<br>• 64 Conv2D Transpose 4x4 filters, with stride 2<br>• BatchNormalization + LeakyReLU<br>• 32 Conv2D Transpose 4x4 filters, with stride 2<br>• BatchNormalization + LeakyReLU<br>• 16 Conv2D Transpose 4x4 filters, with stride 2<br>• BatchNormalization LeakyReLu<br>• 1 Conv2D Transpose 4x4 filter with stride 1<br>• Output layer image with the size 128x128 | • Input layer image with the size 128x128<br>• 16 Conv2D 4x4 filters, with stride 1<br>• LeakyReLU + Dropout<br>• 32 Conv2D 4x4 filters, with stride 2<br>• LeakyReLU + Dropout<br>• 64 Conv2D Transpose 4x4 filters, with stride 2<br>• LeakyReLU + BatchNormalization<br>• 128 Conv2D 4x4 filters, with stride 2<br>• LeakyReLU + Dropout<br>• Linear 10,384x1<br>• Dense layer with the size 128<br>• LeakyReLU<br>• Output layer continuous values by Wasserstein distance | • Input layer image with the size 128x128<br>• 16 Conv2D 4x4 filters, with stride 1<br>• LeakyReLU + Dropout<br>• 32 Conv2D 4x4 filters, with stride 2<br>• LeakyReLU + Dropout<br>• 64 Conv2D Transpose 4x4 filters, with stride 2<br>• LeakyReLU + BatchNormalization<br>• 128 Conv2D 4x4 filters, with stride 2<br>• LeakyReLU + Dropout<br>• Linear 10,384x1<br>• Dense layer with the size 128<br>• LeakyReLU<br>• Output layer softmax with the label of the image |

FIG. 13B

GENERATING GEOLOGICAL FACIES MODELS WITH FIDELITY TO THE DIVERSITY AND STATISTICS OF TRAINING IMAGES USING IMPROVED GENERATIVE ADVERSARIAL NETWORKS

CROSS-REFERENCE TO RELATED APPLICATION(S)

The present disclosure is a National Stage Entry of International Application No. PCT/US2020/050656, filed on Sep. 14, 2020, which claims priority from U.S. Provisional Patent Application Nos. 62/899,244 and 62/899,579, both filed on Sep. 12, 2019, and herein incorporated by reference in their entireties.

FIELD

The present disclosure relates to machine learning techniques for geological facies modeling.

BACKGROUND

Goodfellow et al.," Generative Adversarial Nets," NIPS'14: Proceedings of the 27th International Conference on Neural Information Processing Systems, Volume 2, December 2014 pages 2672-2680, describes a Generative Adversarial Network (GAN), which is a class of machine learning networks that is gaining popularity in the deep learning industry, particularly in computer vision for generating photo-realistic images. The GAN is a generative model composed of a generator and a discriminator, each parametrized by a separate neural network. The generator is trained to map a latent vector z into an image, while the discriminator is trained to distinguish the real (training) images from those that have been generated by the generator. Both the generator and the discriminator are considered as two players that play a minimax game in an adversarial fashion with the following loss function:

$$L = \min_G \max_D V(D, G) = E_{x \sim P_{data}}[\log D(x)] + E_{z \sim P_{noise}}[\log(1 - D(G(z)))] \quad \text{Eqn. (1)}$$

where V(D, G) represents the reward (also known as loss) for the discriminator that aims to maximize its value by forcing D(x) to approach 1 and D(G(x)) being as close as 0 while the generator tends to minimize its loss by boosting D(G(z))) to be 1.

FIG. 1 illustrates a GAN configured to generate photo-realistic images. The GAN consists of two networks: the generator network and the discriminator network. The generator network generates fake images to fool the discriminator while the discriminator aims to distinguish the real images from the training data from the fake ones by the generator network.

A more efficient and practical structure of GANs was proposed by Radford et al. in "Unsupervised Representation Learning with Deep Convolutional Generative Adversarial Networks," arXiv: 151106434, 2015, which introduced deep convolutional generative adversarial networks (DCGAN) to learn a hierarchy of representations from object parts to scenes in both the generator and discriminator. The DCGAN replaces pooling layers with strided convolutions (discriminator) and fractional-strided convolutions (generator), uses batch normalization in both the generator and the discriminator, removes fully connected hidden layers for deeper architectures, uses the ReLU activation function in the generator for all layers except for the output (which uses the Tanh activation function), and uses the LeakyReLU activation function in the discriminator for all layers. This DCGAN structure has become a standard implementation of GANs in general image representations and image generations.

The emerging application areas of GANs include physics, astronomy, chemistry, biology, health care, geology, arts, and others. Despite these promising applications, training GANs is notoriously difficult because of a well-known phenomenon called "mode collapse" where the generator produces very limited varieties of samples, causing either non-converged or vanishing gradients in the process of GAN training. The biggest disadvantage resulting from mode collapse is the biased sampling in GANs that tends to compromise the use of GAN generated samples to make predictions when the uncertainty needs to be considered and addressed in an objective manner. This is particularly true when applying GANs to model geology.

Another disadvantage of GANs is that the latent vector used for image generation is highly entangled, i.e., one cannot know if each separate element in the latent vector could have any semantic meaning. Therefore, the latent vector lacks the ability to interpret the salient attributes of the data.

The mode collapse phenomenon in the original GAN approach was later discussed in Chen et al., "Infogan: Interpretable Representation Learning by Information Maximizing Generative Adversarial Nets," 30th Conference on Neural Information Processing Systems (NIPS), 2016, which explained the mode collapse phenomenon because of the entangled information embedded in the latent space. The authors proposed an extension to the original GANs such that it can learn disentangled representation in a completely unsupervised or semi-supervised manner. The authors introduced additional latent codes c on top of a simple continuous input noise vector z to impose selective representations in a disentangled manner to overcome the limitation in the generator since it creates samples in a highly entangled way due to the lack of the correspondence between the individual dimensions of Z and the semantic features of the data. This approach was named Information Maximizing GAN or InfoGAN and it can generate samples with the variety in the training data by maximizing the discerning capability of each code, or label to its associated images using the mutual information concept in information theory. The demonstrative examples include the disentangling of the writing styles from digit shapes on the MNIST dataset, pose from lighting of 3D rendered images and background digits from the central digit on the SVHN dataset.

FIG. 2 illustrates the InfoGAN structure, which is similar to the GAN structure in FIG. 1, except for the added latent codes c in the input layer and an extra classifier in the output layer of the network that provides the continuous or categorical probability p(c|x) of the latent codes c given the input x.

Recently, the original GANs have been applied to geology and reservoir engineering. Specifically, Chan & Elsheikh in "Parametrization and Generation of Geological Models with Generative Adversarial Networks," arXiv: 170801810, 2017, proposed parameterizing a geological model using GANs. Mosser et al., "Applied Subsurface Geological Mapping, Second Edition," Physical Review E 96(4):043309, 2017, proposes the use of GANs to reconstruct porous medium from CT-scan rock samples. Furthermore, Laloy et al., "Training-image based Geostatistical Inversion using a Spatial Generative Adversarial Neural Network," Water Resources Research 54, 2017, 381-406, discusses the use of GANs in image-based geostatistical inversion.

Dupont et al., "Generating Realistic Geology Conditioned on Physical Measurements with Generative Adversarial Networks," arXiv: 180203065, 2018, was the first publication using GAN's to generate geological models at the reservoir scale constrained to well data. A library of reservoir-scale 2D models was generated by object-based modeling (abbreviated as OBM) as described by Holden et. Al., "Modeling of Fuvial Reservoirs with Object Models," Mathematical Geology 30(5), 1998, 473-96, and Skorstad et al., "Well Conditioning in a Fluvial Reservoir Model," Mathematical Geology 31(7), 1999, 857-872. The 2D models were used as training images that exhibit and represent a wide variation of depositional facies patterns. A semantic inpainting scheme was used to generate conditional models by GANs that fully honor the partially known data. The semantic imprinting scheme is described in Li et al., "Context-aware Semantic Inpainting," arXiv: 171207778, 2017, Pathak et al., "Context Encoders: Feature Learning by In-painting," Proceedings of the IEEE conference on computer vision and pattern recognition, 2016, 2536-44, and Yeh et al., "Semantic Image Inpainting with Perceptual and Contextual Losses," arXiv: 160707539, 2016.

Later, an extension of the work by Dupont et al. to three-dimensional (3D) images of geological facies was presented by Zhang et al. in "Normalized Direction-preserving Adam," arXiv: 170904546, 2019. It demonstrated that GANs outperforms the advanced geostatistical reservoir modeling approaches such as multi-point statistics (MPS) in generating more geologically realistic 3D facies models constrained by well data, particularly when the subsurface geology contains non-stationary and heterogeneous geological sedimentary patterns such as progradational and aggradational trend, which is a ubiquitous phenomenon in most reservoirs.

Despite the promising applications of GANs in geological modeling, several key issues remain that prevent its successful use in building faithful reservoir facies models that can be utilized for the objective uncertainty evaluation and optimal decision-making in exploration and field developments in the oil industry. The root cause of these issues is the frequent mode collapse in the training of the original GAN, leading to severely biased samples by the generator and the lack of diversity in the resulting models, which further compromise the usefulness of the facies models produced by GANs.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Neural network systems and related machine learning methods for geological modeling are provided that employ an improved generative adversarial network including a generator neural network and a discriminator neural network. The generator neural network is trained to map a combination of a noise vector and a category code vector as input to a simulated image of geological facies. The discriminator neural network is trained to map at least one image of geological facies provided as input to corresponding probability that the image of geological facies provided as input is a training image of geological facies or a simulated image of geological facies produced by the generator neural network.

In embodiments, the discriminator neural network can be further trained to map at least one image of geological facies provided as input to a label corresponding to a category of geological facies for the at least one image of geological facies.

In embodiments, the discriminator neural network and the generator neural network can be trained adversarially using an objective function in which the discriminator neural network aims to maximize reward by increasing the likelihood of correctly distinguishing training images of geological facies from simulated images of geological facies produced by the generator neural network, while the generator network attempts to reduce the likelihood that the simulated images of geological facies produced by the generator neural network are recognized as such by the discriminator neural network.

In embodiments, the discriminator neural network can be trained using both simulated images of geological facies produced by the generator neural network and training images of geological facies that are suitable for geological models with labels for the category code vectors for the training images.

In embodiments, the objective function can be based on Wasserstein distance between training images of geological facies and simulated images of geological facies produced by the generator neural network as well as a gradient penalty function that penalizes a gradient whose norm is away from one.

In another aspect, a method of geological modeling is provided that involves a training phase and an online phase. In the training phase, a generator neural network is trained to map a combination of a noise vector and a category code vector as input to a simulated image of geological facies, and a discriminator neural network is trained to map at least one image of geological facies provided as input to corresponding probability that the image of geological facies provided as input is a training image of geological facies or a simulated image of geological facies produced by the generator neural network. In the online phase, input data comprising a combination of a noise vector and a category code vector is supplied to the trained generator neural network to output a simulated image of geological facies.

In embodiments, the operations of the online phase can be repeated with input data having variation in the noise vector to output a plurality of different simulated images of geological facies from the generator neural network.

In embodiments, the plurality of different simulated images of geological facies can be used as equal probable images of geological facies.

In embodiments, the operations of the online phase can be repeated with input data having variation in the category code vector to output a plurality of simulated images of different types of geological facies from the generator neural network.

In embodiments, the training phase can further comprise training the discriminator neural network to map at least one image of geological facies provided as input to a label corresponding to a category of geological facies for the at least one image of geological facies.

In embodiments, the online phase can further involve supplying at least one simulated image of geological facies output from the generator neural network as input to the discriminator neural network to output a label corresponding to a category of geological facies for the at least one simulated image of geological facies.

In embodiments, the training phase can involve training the discriminator neural network and the generator neural network adversarially using an objective function in which the discriminator neural network aims to maximize reward by increasing the likelihood of correctly distinguishing training images of geological facies from simulated images of geological facies produced by the generator neural network, while the generator network attempts to reduce the likelihood that the simulated images of geological facies produced by the generator neural network are recognized as such by the discriminator neural network.

In embodiments, the training phase can involve training the discriminator neural network using both simulated images of geological facies produced by the generator neural network and training images of geological facies that are suitable for geological models with labels for the category code vectors for the training images.

In embodiments, the objective function used in the training phase of the method can be based on Wasserstein distance between training images of geological facies and simulated images of geological facies produced by the generator neural network as well as a gradient penalty function that penalizes a gradient whose norm is away from one.

In embodiments, the online phase can involve conditioning the simulated image of geological facies output by the generator neural network based on field measurement data (such as well data, seismic survey data or other field data).

In embodiments, the conditioning of the online phase can optimize the noise vector input to the generator neural network using stochastic gradient descent by normalizing a gradient vector into a unit vector.

In embodiments, the simulated image of geological facies output by the generator neural network can be used to generate data for assisting optimal oilfield decision making. For example, the generated data can be an e-type map for a reservoir, wherein the e-type map constructed by averaging a plurality of simulated images of geological facies output by the generator neural network.

In embodiments, the training images of geological facies can be generated by object-based modeling, geological process modeling or other tools.

In embodiments, the training images of geological facies and the simulated images of geological facies can each comprise a two-dimensional image of pixels or a three-dimensional volume of voxels. The pixels or voxels of the simulated images and the training images can represent attributes (such as rock-type) of geological facies of a subterranean formation or portion thereof.

In embodiments, the noise vector can be in a one-dimensional latent space, and the category code vector can have specific values for different categories of geological facies represented by the simulated images produced by the generator neural network.

In embodiments, the generator neural network and the discriminator neural network can each comprise a convolutional neural network.

In embodiments, the at least one of the generator neural network and the discriminator neural network can be realized by a processor.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 4 also depicts examples from 15000 simulated binary fluvial images (left-most on the bottom of the figure with channel sand (black) and shale background (white)) produced by a GAN, an e-type map (estimation type) constructed from the simulated images produced by the GAN, and a histogram of e-type for the pixels of the e-type map constructed from the simulated images produced by the GAN;

FIG. 6 also depicts an e-type map (estimation type) constructed from 15000 simulated binary fluvial images produced by the Info-WGAN, and a histogram of e-type for the pixels of the e-type map constructed from the simulated images produced by the Info-WGAN;

FIG. 9 also depicts an e-type map (estimation type) constructed from 15000 simulated binary images (Fluvial and Deltaic) produced by the Info-WGAN trained on the training images of FIG. 7, and a histogram of e-type for the pixels of the e-type map constructed from the simulated images produced by the Info-WGAN;

FIG. 12 also depicts an e-type map (estimation type) constructed from simulated images of deltaic deposition environments produced by the Info-WGAN trained on the training images of FIG. 10, and a histogram of e-type for the pixels of the e-type map constructed from the simulated images of deltaic deposition environments produced by the Info-WGAN;

FIG. 13B is a table that includes details of an embodiment of an Info-WGAN;

DETAILED DESCRIPTION

Figure 1:
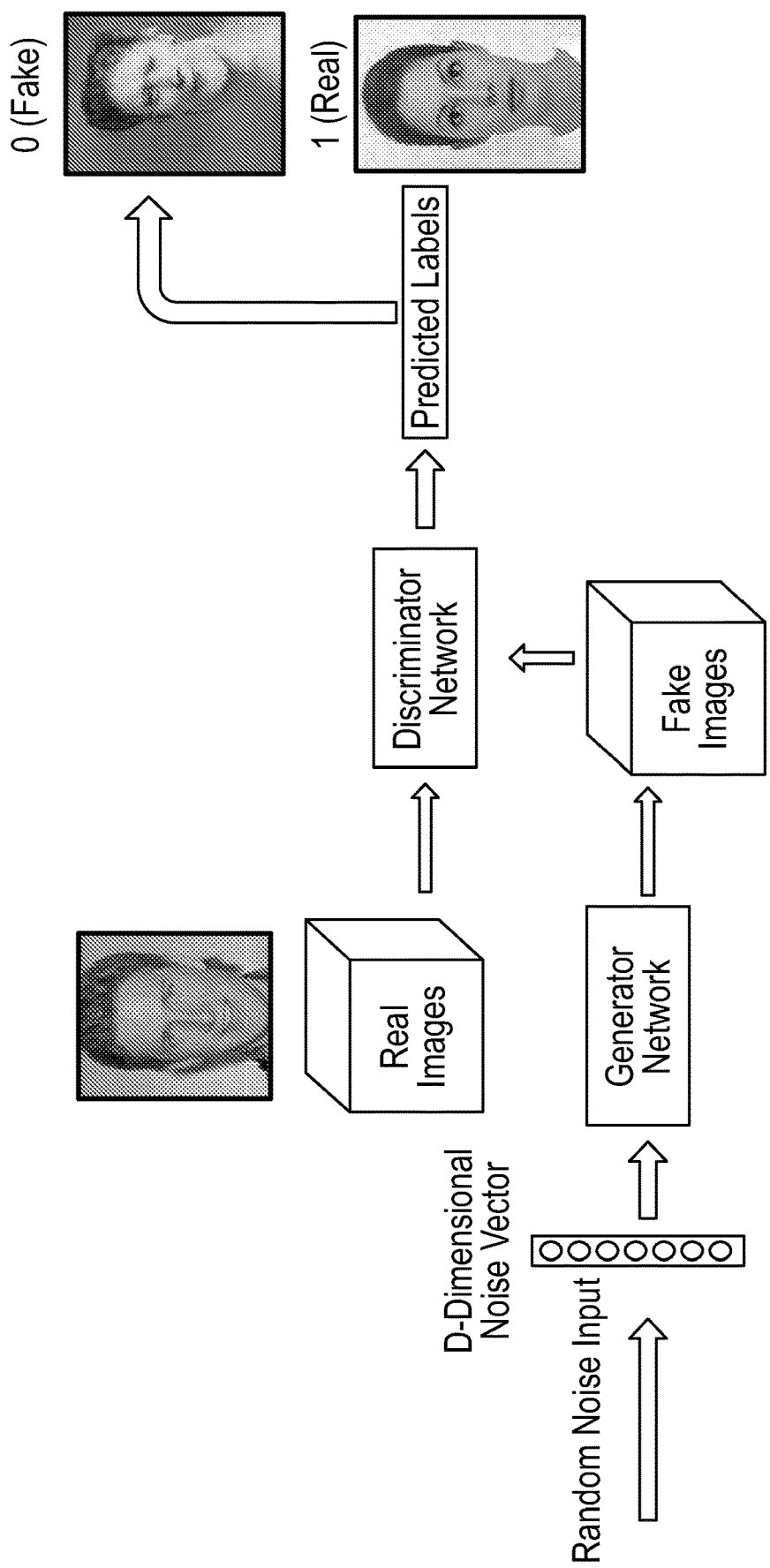
FIG. 1 is a schematic diagram of a generative adversarial network (GAN) configured to generate photo-realistic images.
Figure 2:
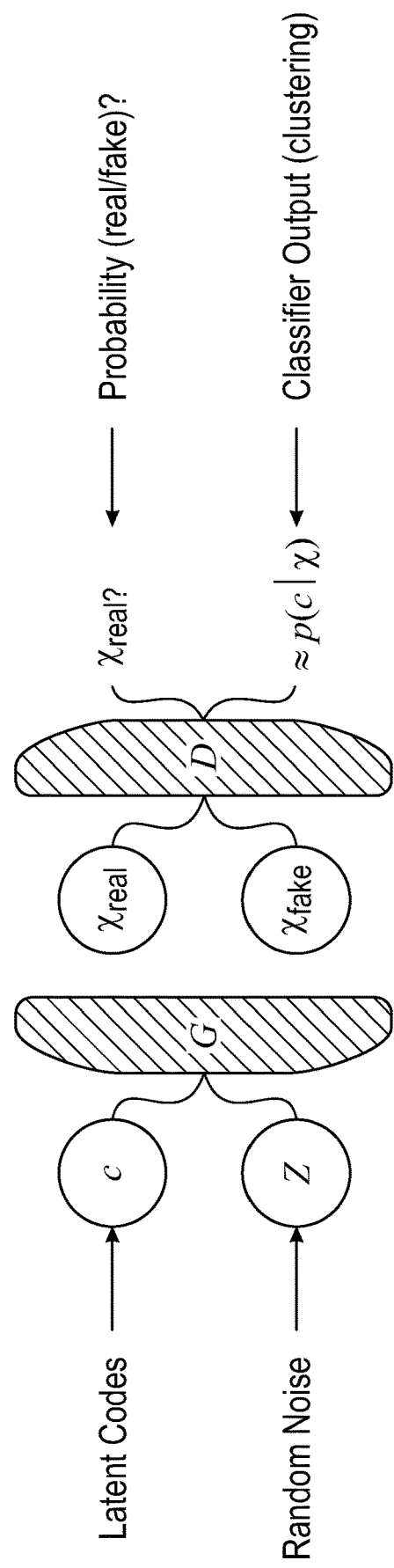
FIG. 2 is a schematic diagram of an Information Maximizing GAN or InfoGAN.

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

The present disclosure provides methodologies and systems that overcome the limitations of the conventional GANs for geological facies modeling by improving the training stability and guaranteeing the diversity of the generated geology through interpretable latent vectors. The resulting samples can be ensured to have the equal probability (or an unbiased distribution) as from the training dataset. This is critical when applying GANs to generate unbiased and representative geological models that can be further used to facilitate objective uncertainty evaluation and optimal decision-making in oil field exploration and development.

The methodology and system of the present disclosure employ a new variant of GANs, which is referred to as an "Info-WGAN" for modeling geological facies. The Info-WGAN can be configured to combine the information maximizing generative adversarial network (InfoGAN) with Wasserstein distance and gradient penalty (GP) for learning interpretable latent codes as well as generating stable and unbiased distribution from the training data. Different from the original GAN design, the Info-WGAN can use the training images with full, partial, or no labels to perform disentanglement of the complex sedimentary types exhibited in the training dataset to achieve the variety and diversity of the generated samples. This is accomplished by adding additional categorical variables that provide disentangled semantic representations besides the mere randomized latent vector used in the original GANs. By such means, a regularization term is used to maximize the mutual information between such latent categorical codes and the generated geological facies in the loss function.

Furthermore, the resulting unbiased sampling by the Info-WGAN makes the data conditioning much easier than the conventional GANs in geological modeling because of the variety and diversity as well as the equal probability of the unconditional sampling by the generator.

The geological facies modeled by the Info-WGAN represent a subdivision of sedimentary rock that can be distinguished by lithology, including the texture, mineralogy, grain size, and the depositional environment that produced it. For example, the geological facies can represent fluvial deposits (which are sediments deposited by the flowing water of a stream or river), deltaic facies or other suitable facies.

Figure 3:
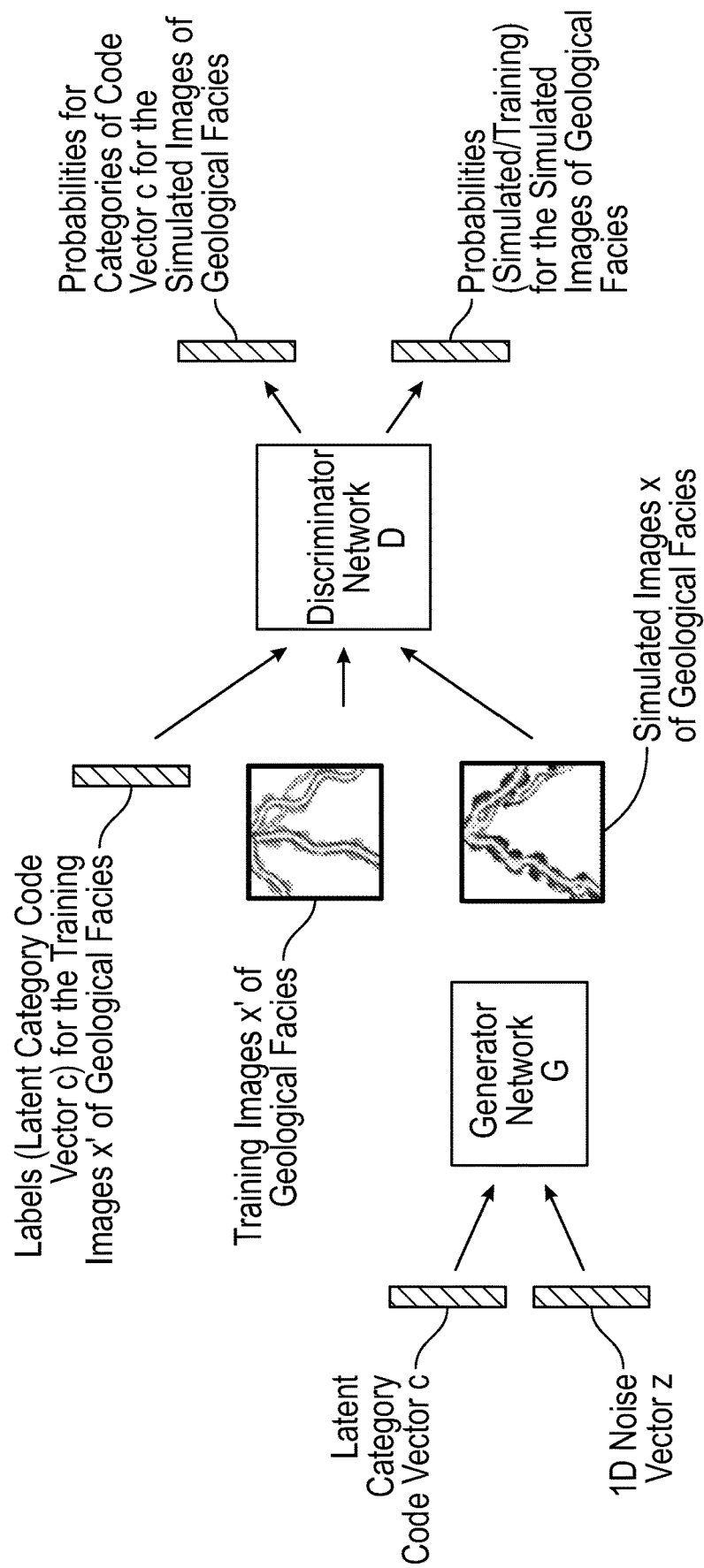
FIG. 3 is a schematic diagram of an Info-WGAN system for modeling geological facies according to embodiments of the present disclosure.

The Info-WGAN includes a generator network G and a discriminator network D, each parameterized by separate neural networks. A neural network is a computational model that includes a collection of layers of nodes interconnected by edges with weights and activation functions associated with the nodes. Inputs are applied to one or more input nodes of the neural network and propagate through the neural network in a manner influenced by the weights and activation functions of the nodes, e.g., the output of a node is related to the application of the activation function to the weighted sum of its inputs. As a result, one or more outputs are obtained at corresponding output node(s) of the neural network. The layer(s) of nodes between the input nodes and the output node(s) are referred to as hidden layers, and each successive layer takes the output of the previous layer as input. Parameters of the neural network, including the weights associated with the nodes of the neural network, are learnt during a training phase (or training). FIG. 3 illustrates the Info-WGAN structure.

The generator network G of the Info-WGAN is trained to map a combination of a noise vector z and a latent code vector c as input to a simulated image x (such as a 2D image of pixels or 3D volume of voxels) of geological facies. For example, the pixels or voxels of the simulated image x can represent attributes, such as rock type, of geological facies of a subterranean formation or portion thereof. The noise vector z is in a one-dimensional latent space. The latent code vector c can have specific values for different categories of geological facies represented by the simulated image x.

The discriminator network D of the Info-WGAN can be trained to map images (such as a 2D image of pixels or 3D volume of voxels) of geological facies provided as input to probabilities that the images are training images (real) of geological facies or simulated images of geological facies produced by the generator network G. The discriminator network D can also be trained to map the images of geological facies provided as input to labels corresponding to the category(ies) of geological facies of such images. The dimensional space of the category labels output by the discriminator network D corresponds to the different categories of geological facies represented by the latent code vector c input to the generator network G during training. During the training phase, the images that are input to the discriminator network D include both simulated images x of geological facies produced by the generator network G as well as training images x' of geological facies that is suitable for geological models (with labels for the known latent category vector c for the training images x'). The training images x' of geological facies can be generated by object-based modeling, geological process modeling or other tools.

In the training phase, the discriminator network D and the generator network G of the Info-WGAN are trained adversarially using an objective function in which the discriminator network D aims to maximize reward by increasing the likelihood of correctly distinguishing training images of geological facies from simulated images of geological facies produced by the generator network G, while the generator network G attempts to reduce the likelihood that the simulated images of geological facies produced by the generator network G are recognized as such by the discriminator network D.

In an online phase after the training phase is complete and the generator network G has been trained, combinations of values for the noise vector z and latent code vector c can be input to the generator network G, which is configured to map each combination of noise vector z and latent code vector c into a simulated image of geological facies given the combination of noise vector z and latent code vector c as input. The values for the latent code vector c as part of the input to the generator network G can be varied such that the generator network G generates simulated images for different categories of geological facies as represented by the values of the code vector c. The values for the noise vector z as part of the input to the generator network G can be varied in combination with a particular code vector c such that there is variance in simulated images generated by the generator network G for the category of geological facies as represented by the value of particular code vector c. The simulated images of geological facies generated by the generator network G can reproduce the statistics or the spatial distributions of the geological facies from the training images, and thus can be suitable for geological models themselves. The trained discriminator network D can be used in the online phase to map one or more simulated images of geological facies produced by the generator network G as input to a label corresponding to a particular category of geological facies for each simulated image. The dimensional space of the category label output by the discriminator network D corresponds to the different categories of geological facies represented by the latent code vector c input to the generator network G during training.

In embodiments, the objective function used to train the Info-WGAN can involve one or more parametric equations that represent an InfoGAN loss (Eqn. (2) below), a Wasserstein distance (Eqn. (3) below), or a gradient penalty loss that builds upon Wasserstein distance (Eqn. (4) below).

InfoGAN loss can be defined as follows:

$$V_{InfoGAN}(D,G) = E_{x \sim P_{data}}[\log D(x)] + E_{z \sim P_G}[\log(1-D(G(z)))] - \lambda I(c; G(z,c)) \quad \text{Eqn. (2)}$$

where the last term represents the mutual information term with c indicating the latent code vector and $\lambda$ being a regularization factor.

Wasserstein distance can be defined as follows:

$$W(P_{data}, P_g) = \inf_{\gamma \sim \Pi(P_{data}, P_g)} E_{(x,y) \sim \gamma}[\|x - y\|] = \sup_{\|f\|_L} E_{x \sim P_{data}}[f_w(x)] - E_{x \sim p_y}[f(x)] \quad \text{Eqn. (3)}$$

where the function $W(P_{data}, P_g)$ is the earth-mover distance that is formally defined as the minimum cost of transporting mass in order to transform the training image data distribution $P_{data}$ to the generated image data distribution $P_g$, and f is an arbitrary function defined in the real field. In our context, f is the discriminator network D with weights w.

The Wasserstein distance can be used as a gradient penalty to achieve a much smoother loss function that reduces the possibility of the training operations getting stuck in local minimums, which is highly likely in the original GAN and easily causes vanishing gradients for training. Details of the Wasserstein distance are described in Arjovsky et al., "Wasserstein GAN," arXiv: 170107875, 2017.

A gradient penalty loss that builds upon the Wasserstein distance of Eqn. (3) can be defined as follows:

$$L_{WGAN-GP}(P_{data}, P_G) = -W(P_{data}, P_G) + \lambda E_{x \sim P_{data}}[(\|\nabla f_w(x)\| - 1)^2] \quad \text{Eqn. (4)}$$

The second term of this function penalizes the gradient whose norm is away from one and can be used to boost the training stability. Details of the gradient loss function are described in Gulrajani et al., "Improved Training of Wasserstein GANs," NIPS 2017, arXiv: 1704.00028, 2017; and Wei et al. "Improving the Improved Training of Wasserstein GANs: A consistency term and its dual effect," International Conference on Learning Representations (ICLR) 27, 2018.

In embodiments, the discriminator network D and the generator network G of the Info-WGAN can be trained adversarially by a process that i) assumes fixed parameters (e.g., weights) of the generator network G and computes an approximation of the Wasserstein distance $W(P_{data}, P_g)$ of Eqn. (3) and gradient penalty loss of Eqn. (4) when training the discriminator network D to convergence using a batch of training images of geological facies and a batch of simulated images of geological facies produced by the generator network G, ii) computes a gradient for the parameters (e.g., weights) of the generator network G based on the gradient penalty loss of Eqn. (4) for the trained discriminator network of i) over a batch of simulated images of geological facies produced by the generator network G, and iii) uses the gradient of ii) to update the parameters (e.g., weights) of the generator network G. This process can be repeated until the parameters (e.g., weights) of the generator network G converge. Note that the training of the discriminator network D in i) known labels for the latent code vector c that corresponds to the training images of geological facies can be input to the discriminator network D for use in the training.

The Info-WGAN can also be adapted to constrain the simulated images of geological facies as generated by the generator network G such these simulated images generated by the generator network G honor field measurements, such as geological facies interpretations at different well locations. This can be achieved by defining a total loss function based on the sum of perceptual loss and contextual loss, where perceptual loss penalizes unrealistic images and contextual loss penalizes mismatch between the simulated images and the well measurements. For example, a total loss function can be defined as:

$$\mathcal{L}_{total}(Z) = \mathcal{L}(Z) + \lambda \mathcal{L}_c(Z|I_1, I_2, \ldots, I_M) \quad \text{Eqn. (5)}$$

where the perceptual loss is defined as $$\mathcal{L}_p(Z) = G(Z) -, \text{ and} \quad \text{Eqn. (6)}$$

the contextual loss is defined as $$\mathcal{L}_c(Z|I_1 = i_1, I_2 = i_2, \ldots, I_M = i_m) = \sum_{k=1}^{K} \sum_{d=1}^{M} \min \|y(i^{(k)}(G(Z)) - y(i_d^{(k)})\|1 \quad \text{Eqn. (7)}$$

where K is the total number of facies, M is the total number of the known facies locations over which to condition the simulated images produced by the generator network G of the Info-WGAN after being trained.

In the contextual loss of Eqn. (7), $\{I_m | m=1, \ldots M\}$, there is a collection of m-facies indicator variables, while lower case $\{i_m | m=1, \ldots M\}$ represents the respective observations such that the observed k-facies indicator at the datum location, d, and y(.) maps a corresponding facies to its pixel (in 2D) or voxel (in 3D) location. The contextual loss is, therefore, the sum of all the mismatched facies over all well locations, denoted as by searching for the shortest distance from the facies location at one individual well to its nearest corresponding facies in the sample generated by generator G, which is represented by $i^{(k)}(G(Z))$. The distance is computed using L1-norm. In the total loss function of Eqn. (5), the parameter $\lambda$ is a regularization factor that controls the trade-off between generating realistic images and the match of known facies data. All the data will be honored once contextual loss approaches zero. This can be achieved by applying a gradient descent method to the noise z-vector in the latent space through a minimization of the total loss function. The iterative process ceases when the error level of the contextual loss function falls below a given threshold. In this case, both the generator network G and the discriminator network D of the Info-WGAN can be trained with the new loss function of Eqn. (4). The difference of the conditioning loss function between the facies generated by the generator network G of the Info-WGAN and the facies generated by the regular (previous) DCGAN, when conditioned on the known well information, is reflected to the perceptual loss function of Eqn. (6).

When the mutual information maximization regularization term is included in the loss function and used to train the Info-WGAN, the latent code vector c can have interpretable physical meaning for the simulated images of geological facies produced by the trained generator network G. For example, when the latent code vector c is provided with a value c=[0, 1] for fluvial, the simulated images of geological facies produced by the trained generator network G can mimic fluvial-type geological facies provided by the training images during the training phase. In another example, when the latent code vector c is provided with a value c=[1,0] for deltaic, the simulated images of geological facies produced by the trained generator network G can mimic deltaic-type geological facies provided by the training images during the training phase.

As described herein, the simulated images of geological facies produced by the trained generator network G can be conditioned or constrained by field measurements, such as facies interpretation in wells, seismic interpretations, or hydrocarbon production data for a reservoir or field. Such simulated images are unbiased and can be used as equal probable realizations of geological facies in the reservoir or field. Specifically, the simulated images can be used in objective uncertainty evaluation where many equal probable realizations of geological facies in the reservoir or field are averaged to assess facies probability for the reservoir or field. For example, an e-type map for a reservoir can be constructed by averaging many generated equal probable realizations. The e-type map can be used for assisting optimal oilfield decision making, such as well drilling, estimation of hydrocarbon reserves in place, estimation of hydrocarbon flow pathways, and reservoir production history matching in reservoirs and fields.

Generating Equal Probable Realizations of Geology Facies Using Info-WGAN

Even though GANs can generate different geological facies models by learning the representation of the sedimentary facies associations from the training images, the samples that are created by the generator network of the GAN can be highly biased. This section describes how this major limitation in GANs is resolved using the Info-WGAN.

1.1 Case 1: Binary Fluvial Facies

Figure 4:
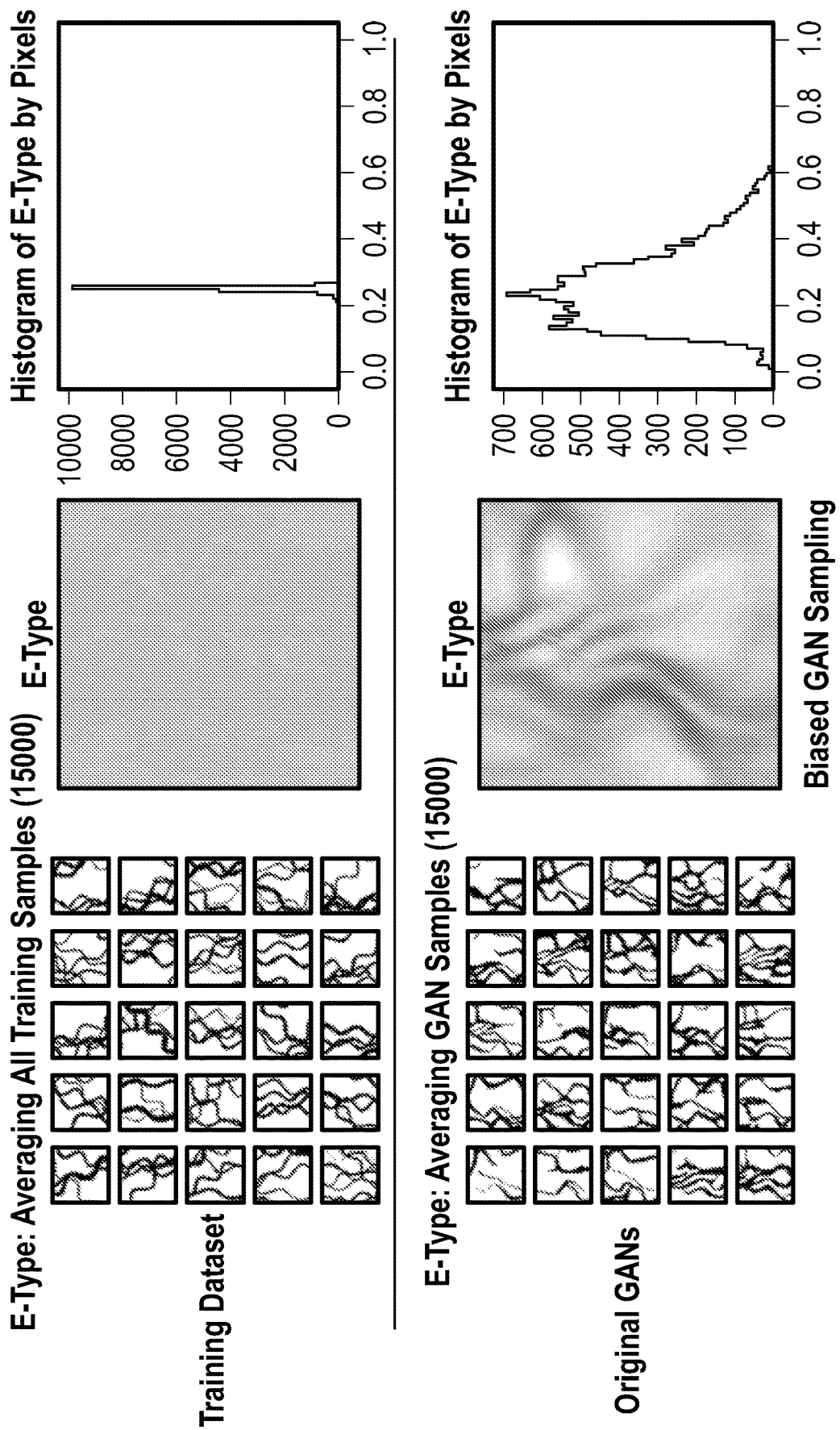
FIG. 4 depicts examples from 15000 binary fluvial training images (left-most on the top of the figure with channel sand (black) and shale background (white)), an e-type map (estimation type) constructed from the training images, and a histogram of e-type for the pixels of the e-type map constructed from the training images.

FIG. 4 shows some training examples from 15000 binary fluvial training images (left-most on the top of the figure with channel sand (black) and shale background (white). The main flow direction of the channels is from north to south with varying channel width, sinuosity, and amplitudes. The channels are distributed evenly in space, i.e. they can happen anywhere in the 2D area that confines the channels in the training images. This can be verified by an e-type map (estimation type) of the training images. The e-type map is considered as an estimation of the channel sand probability in space by performing pixel-wise averaging of all channel images with channel sand being assigned to a value 1 and 0 for the shale background. The e-type map in the middle of the top of FIG. 4 is almost a flat (constant) map, which indicates the channels from the training dataset are evenly spaced and pixels in all the training images are considered as equal probable, meaning that the channels can be at any position with equal probability. This is also a basic assumption required by traditional geostatistical simulations. The approximate constant e-type value is around the mean value of the channel sand proportion from 15000 training images, which can be manifested by a tight histogram of all the e-type pixel values with the mean value being equal to the sand proportion in each of the training images (=0.25 in this case study).

However, if the original GAN method is used, the trained generator becomes highly biased due to the mode collapse even though the samples reproduce the geometry of the channels from the training dataset reasonably (most-left at the bottom of FIG. 4). In contrast to the e-type of the channel training images that is constant and flat, the e-type of the generated samples by GANs (middle at the bottom of FIG. 4) shows that channel sand happens more likely in some area than others, indicating a highly biased learning pattern of GANs. This also suggests that GANs fails to capture the true data distribution during the training, which is manifested in the histogram of e-type with a wide spread of pixel values from 0 to 0.6 (most-right at the bottom of FIG. 4).

This biased sampling is one big hurdle when using GANs for geological modeling because all samples cannot be claimed as truly realistic realizations since they are not equal probably like we normally use in geostatistical simulation. Consequently, all the samples (static facies models) cannot be used for further uncertainty evaluation and propagation when they are fed into flow simulations. Consequently, the e-type of such samples becomes less meaningful since their distribution is different from that of the training dataset, and therefore the e-type cannot be treated to be sand probability map anymore.

Figure 5:
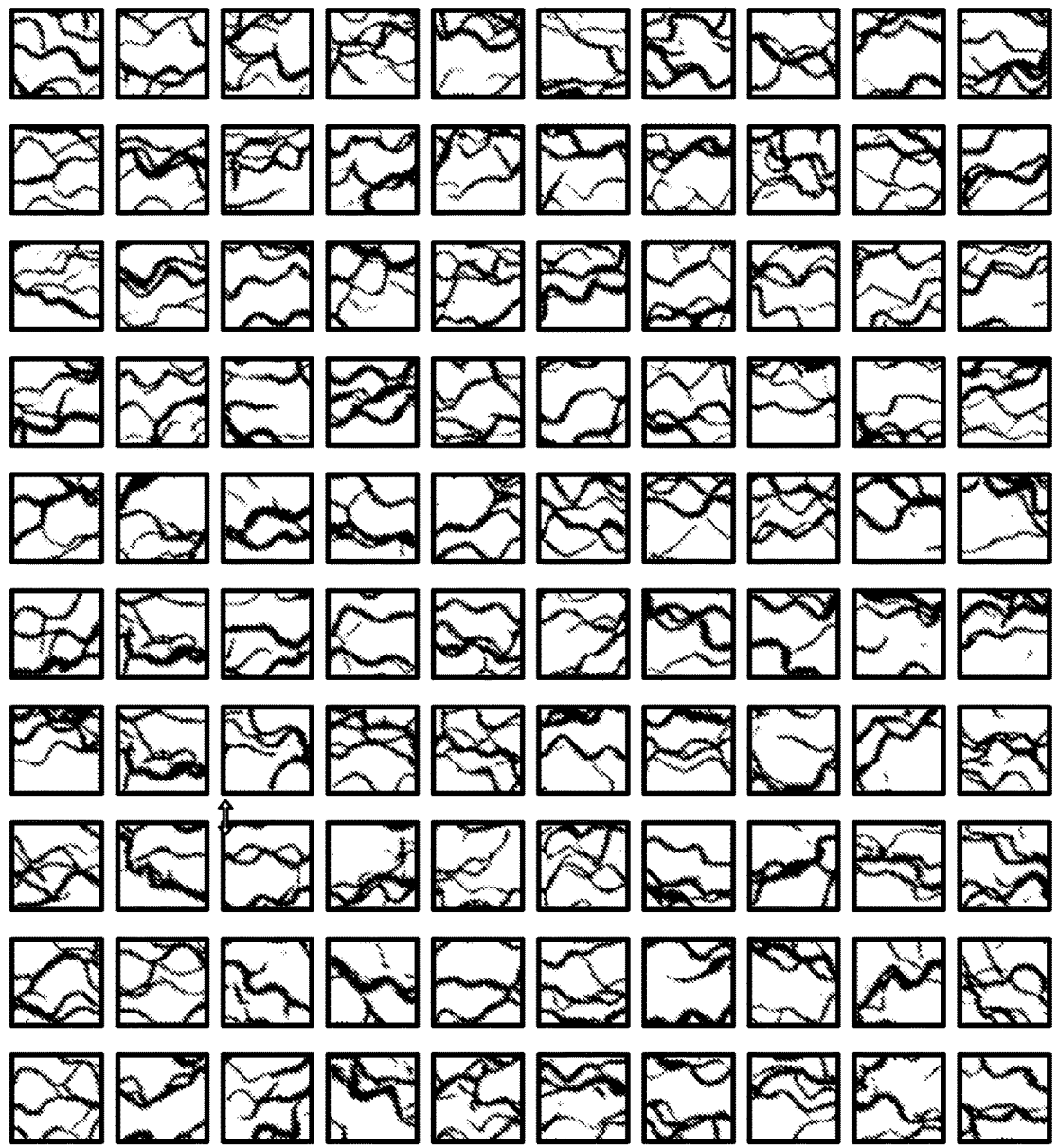
FIG. 5 shows 100 samples (simulated binary facies images) produced by the Info-WGAN of FIG. 3.

The Info-WGAN overcomes this limitation in generating the simulated images of geological facies. The same set of 150000 fluvial training dataset were used to train the Info-WGAN. One categorical latent code was used for all of the fluvial training images to indicate that all the images to be the same type. FIG. 5 shows 100 samples (simulated images of geological facies) generated by Info-WGAN, which suggest reasonable reproduction of the geometry of fluvial deposits.

Figure 6:
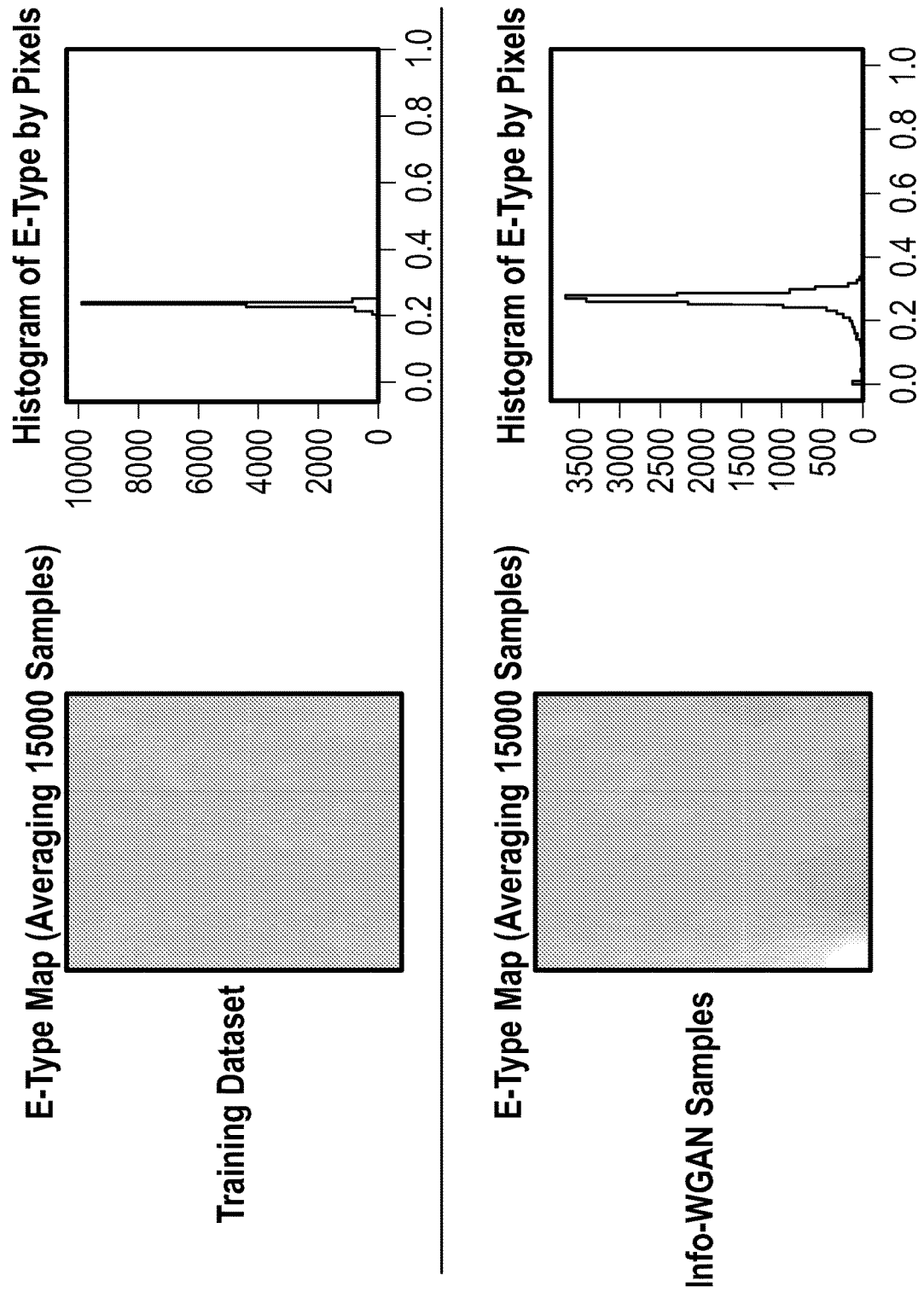
FIG. 6 depicts an e-type map (estimation type) constructed from the 15000 binary fluvial training images, and a histogram of e-type for the pixels of the e-type map constructed from the training images.

Further verification on the e-type of the 150000 fluvial training images suggests that the Info-WGAN can generate diverse and equal probable realizations of the fluvial channels due to the Wasserstein distance used in the model that allows for learning the true distribution of the training dataset. This is a striking contrast to the original GANs. This is manifested in the e-type map (most-left at the bottom of FIG. 6) and the corresponding tight histogram of the pixel values (most-right at the bottom of FIG. 6), which are close to those from the training dataset (most-left and most-right at the top of FIG. 6). The e-type map by the Info-WGAN is very close to that from the training images except for a small artifact area (bright spot) at its lower-left corner.

The superiority of the Info-WGAN relative to the original GANs in creating diverse as well as equal probable samples can be explained by its use of Wasserstein distance and gradient penalty to stabilize the GAN training to avoid mode collapse.

1.2 Case 2: Mixed 2 Types of Fluvial and Deltaic Systems

In this case study, the disentangling capability of Info-WGAN is tested by mixing fluvial and deltaic training images to see whether Info-WGAN is capable of reproducing both types with equal probable realizations by reproducing the correct sand statistics from the training dataset.

Figure 7:
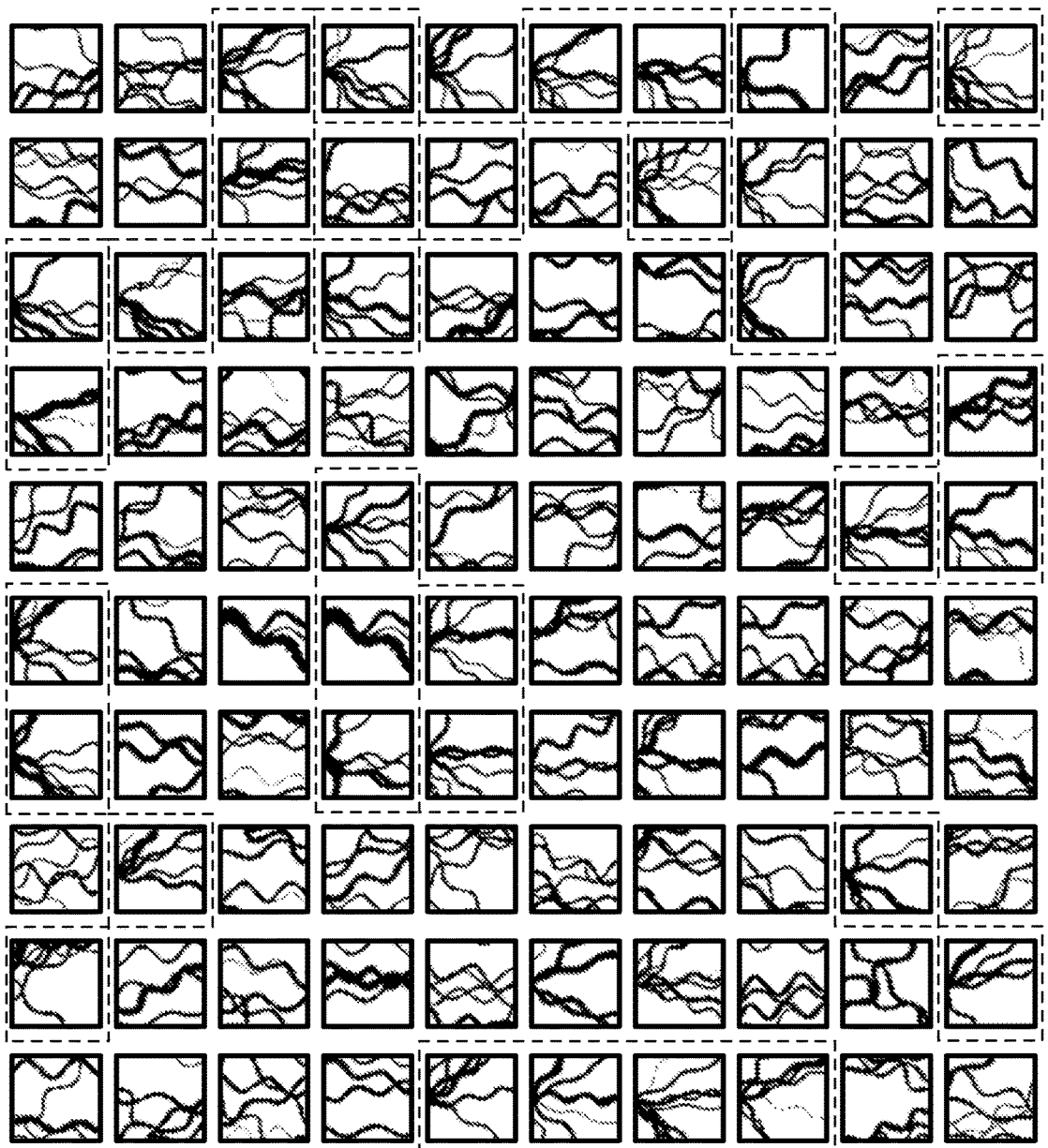
FIG. 7 depicts 100 of 15000 binary training images that contain two mixed types of deposits: one-type is Fluvial (which make up 10000 of the 15000 training images), and the other is Deltaic (which make up 5000 of the 15000 training images and enclosed by dashed squares)

FIG. 7 shows 100 of the total 15000 training images that are generated by OBM, which is a mix of two types depositional environments: fluvial (type-I) and deltaic (type-II). The fluvial training images include channels that mainly follow the north-south direction, while the deltaic training images include channels that start form a point source at the middle of the upper border of the region and then spreads out to the south direction. This dataset creates challenges for the original GANs to learn the diversity and generate images for two types of systems due to the mode collapse limitation.

In this case study, the Info-WGAN was used in a novel way by introducing two bits for the latent category code vector c as follows: c=[0, 1] for the fluvial (type-I) depositional environments and c=[1, 0] for the deltaic (type-II) depositional environments. After training the Info-WGAN, the generator network G can create simulated images for both the fluvial (type-I) depositional environments and the deltaic (type-II) depositional environments, and the discriminator network D of the Info-WGAN can output predictions corresponding to the labels for image type of the simulated images.

Figure 8:
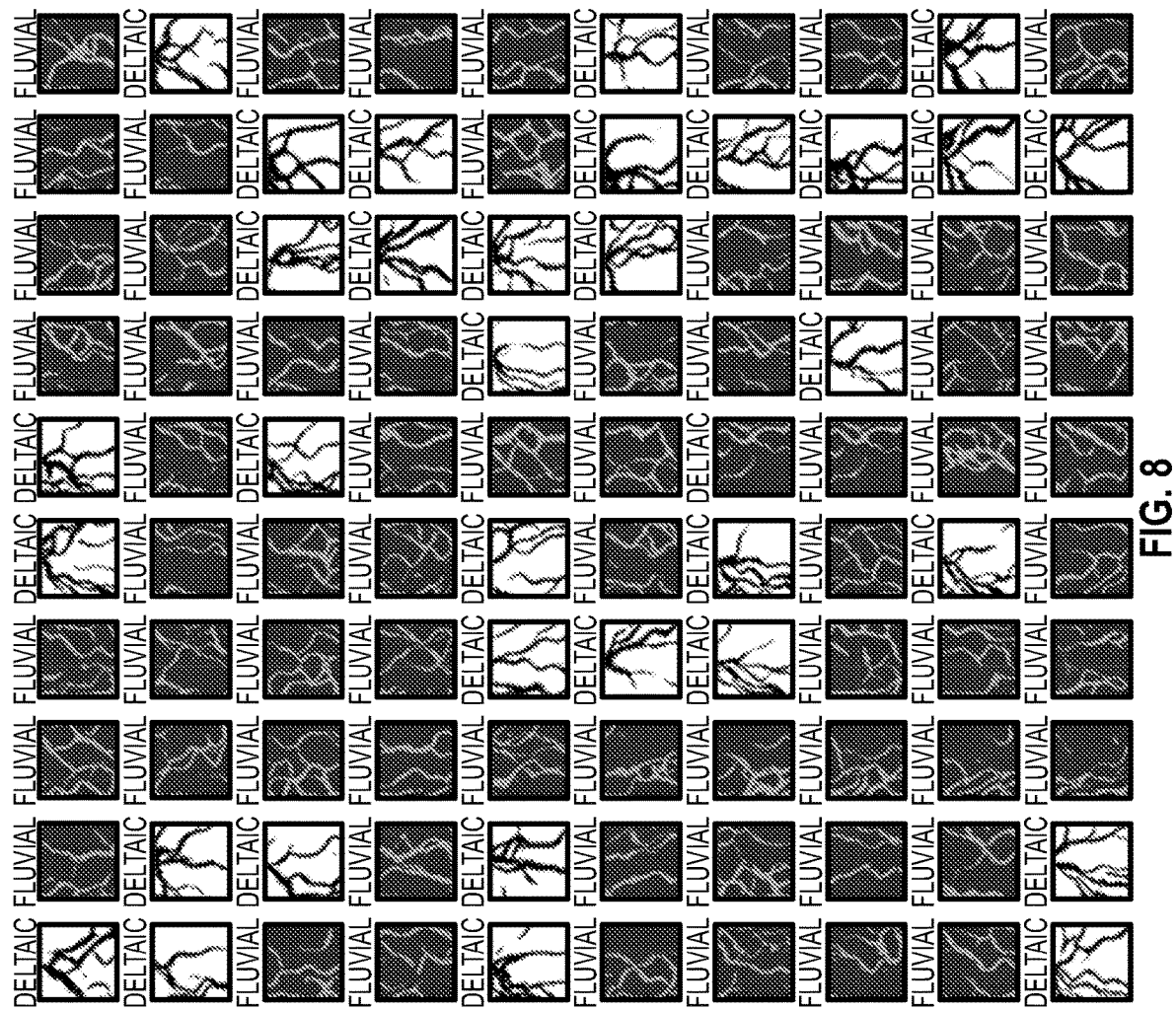
FIG. 8 depicts 100 samples (simulated binary images of geological facies) along with labels for type (Fluvial or Deltaic) as produced by the Info-WGAN trained on the training images of FIG. 7.

FIG. 8 shows 100 samples (simulated images of geological facies) produced by the Info-WGAN that gives a satisfactory mix of the fluvial and deltaic depositional environments, which is a striking contrast with the original GANs that can only generate either the fluvial or deltaic deposits by mapping the noisy vector in the latent space. Because of maximizing the mutual information carried out by the two additional categorical codes, the Info-WGAN can generate a mix of the two different types of environments through disentangling capability without encountering the mode collapse issue that normally happens in the original GANs. Meanwhile, it is worth noting that the use of both Wasserstein distance and gradient penalty also contribute to the training stability of the Info-WGAN.

Figure 9:
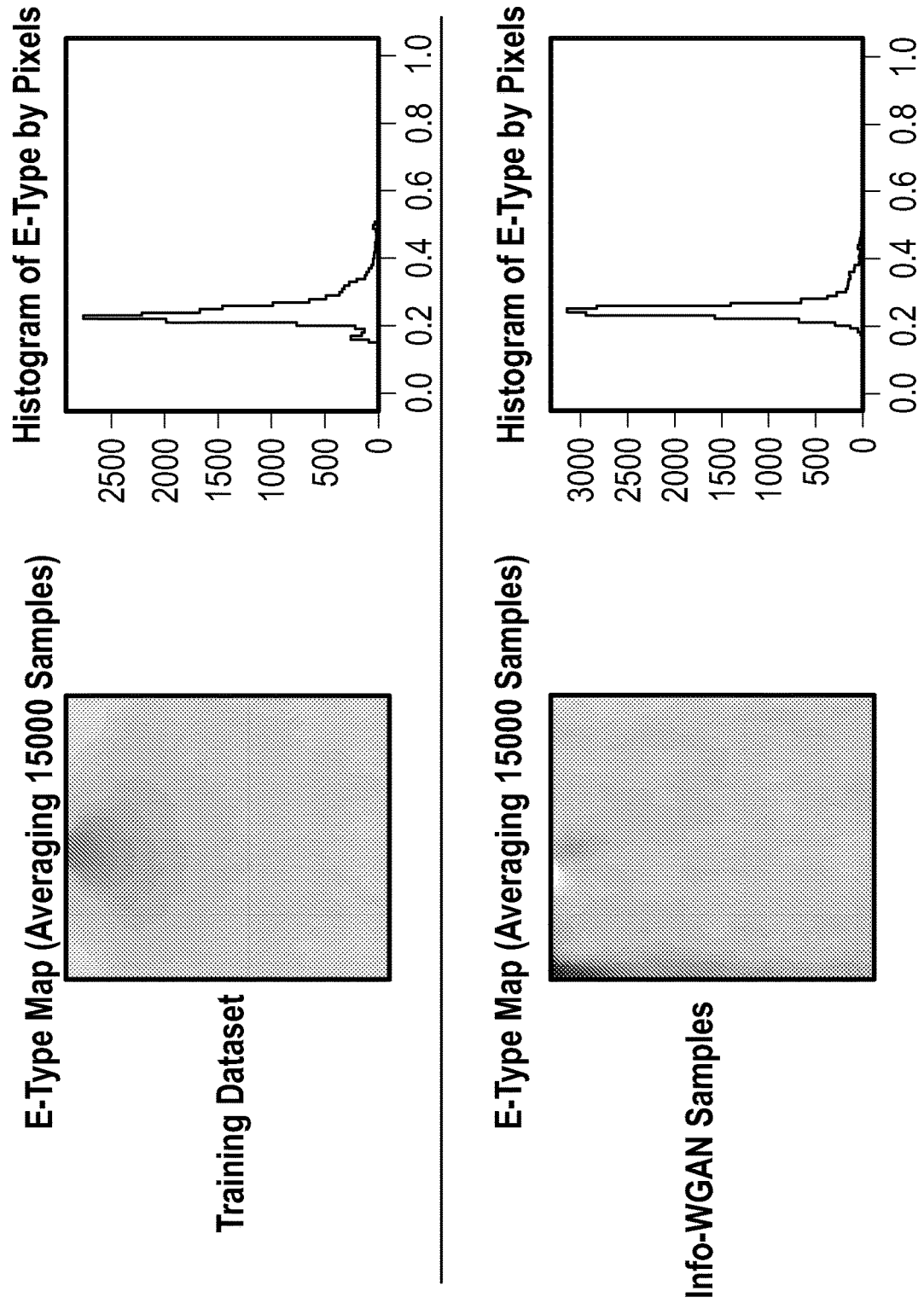
FIG. 9 depicts an e-type map (estimation type) constructed from the 15000 binary training images (Fluvial and Deltaic) of FIG. 7, and a histogram of e-type for the pixels of the e-type map constructed from the training images.

FIG. 9 shows the e-type map of the sand facies and its statistics by pixels (top part of FIG. 9) from 15000 simulated images by the Info-WGAN and similar plots (bottom part of FIG. 9) for the training images. The e-type map for the simulated image show slightly darker regions at the top of the area because of the more concentrated channel sand in the deltaic system. This test case suggests that Info-WGAN can generate the mix of two types of sedimentary systems with much more equal probable realizations by reproducing the correct sand statistics from the training dataset than the original GANs.

1.3 Case 3: Deltaic System with 4 Facies

This case study demonstrates that the Info-WGAN can generate equal probable realizations by reproducing the correct statistics for each facies when there are multiple (>2) facies in the sedimentary system.

Figure 10:
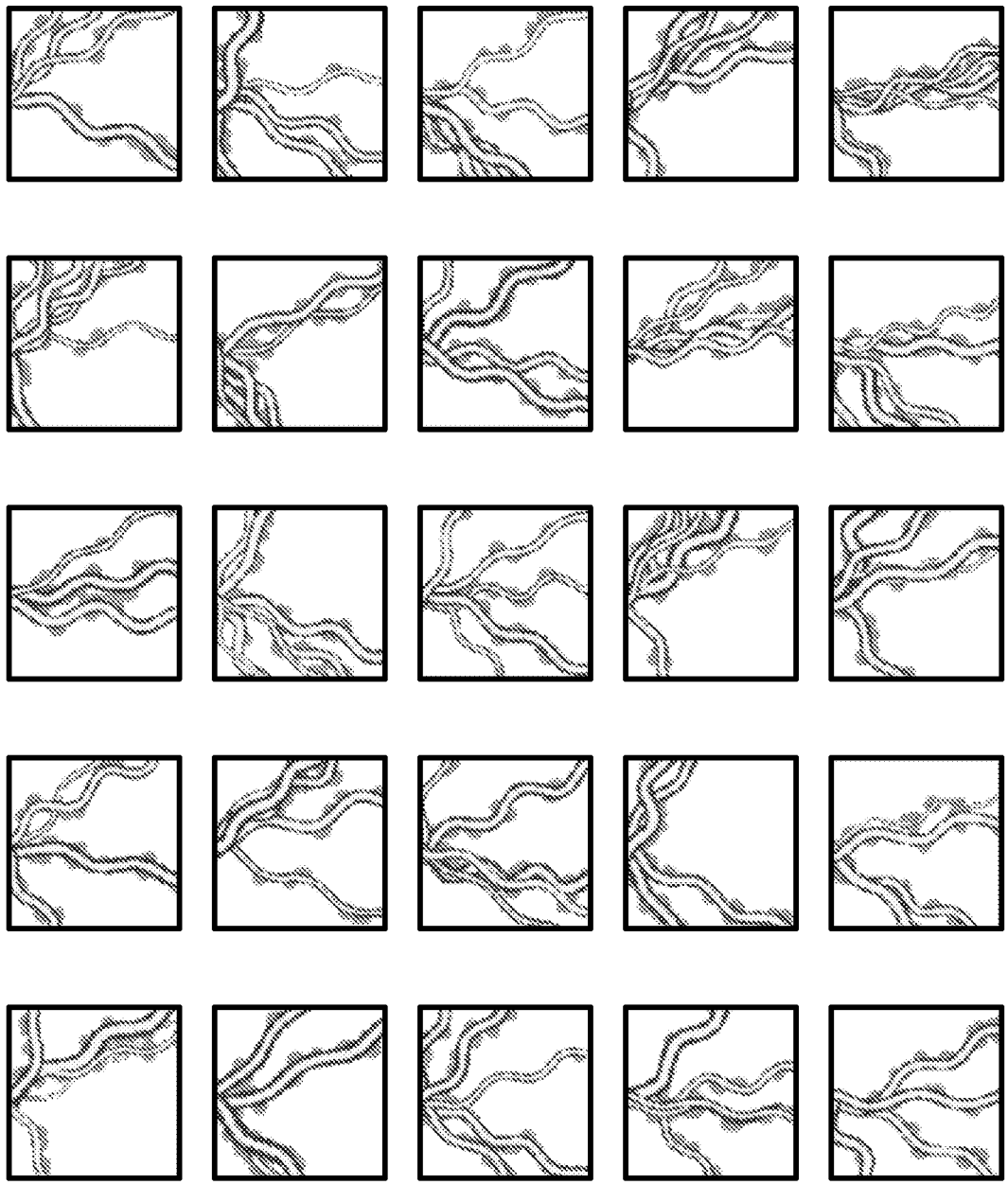
FIG. 10 shows 25 of 10000 training images of deltaic deposition environments with four facies (channel, levee, splay, and shale (background))

FIG. 10 shows 25 of total 10000 deltaic training images with 4 facies: channel, levee, splay and shale background. The facies association can be clearly observed by the following relationships: the channel sand is bounded by the levee that attaches the splay, which is embedded in the shale background (transparent). The Info-WGAN is used with one constant categorical code to train both the generator and discriminator networks and then we let the trained generator network produce samples.

Figure 11:
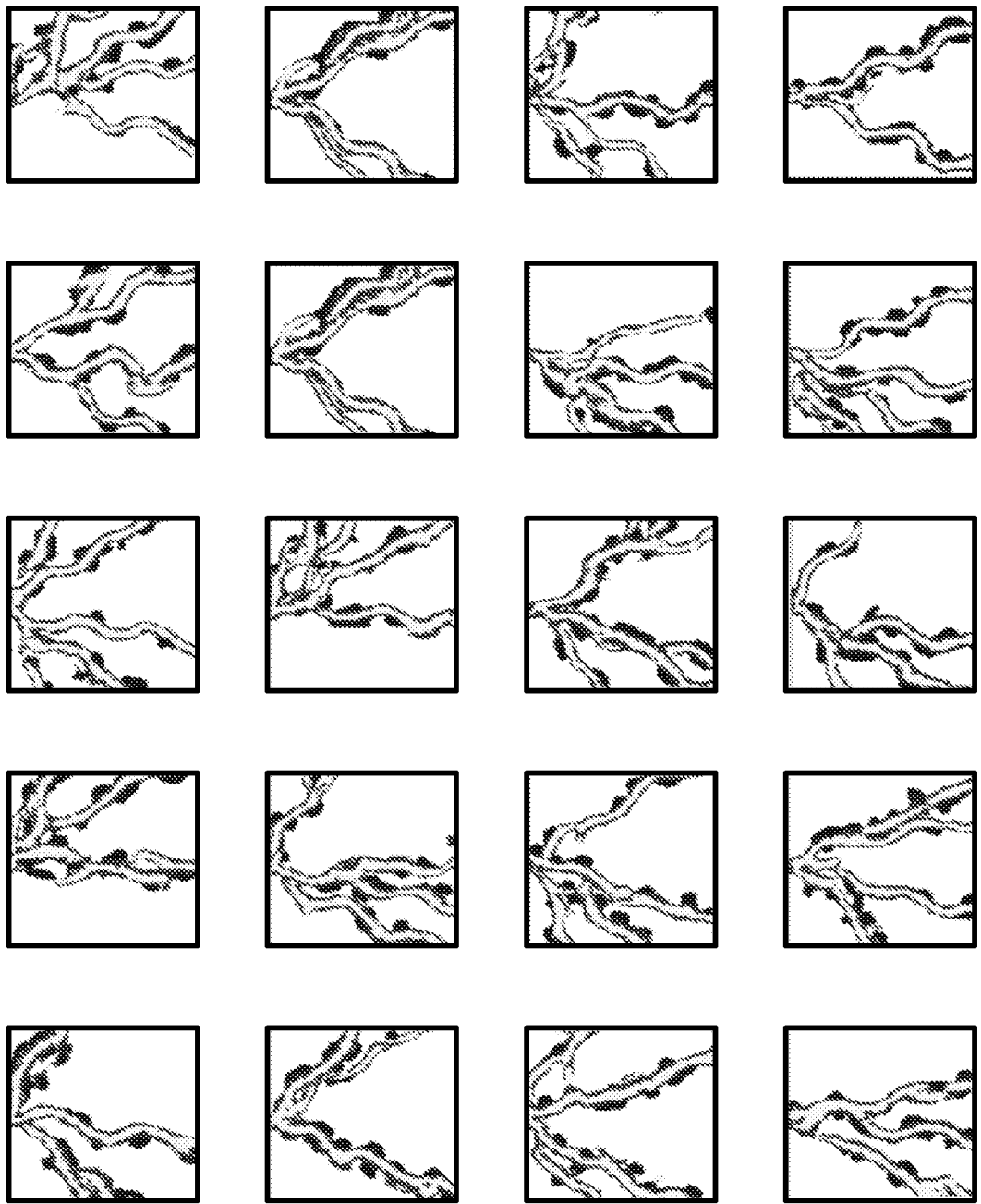
FIG. 11 shows 25 simulated images of deltaic deposition environments with four facies (channel, levee, splay, and shale (background)) produced by the Info-WGAN trained from the training images of FIG. 10.

FIG. 11 shows 25 samples (simulated images of geological facies) generated by the trained generator of the Info-WGAN, which demonstrate reasonable reproduction of the facies geometric relationships, connectivity, and their association.

Figure 12:
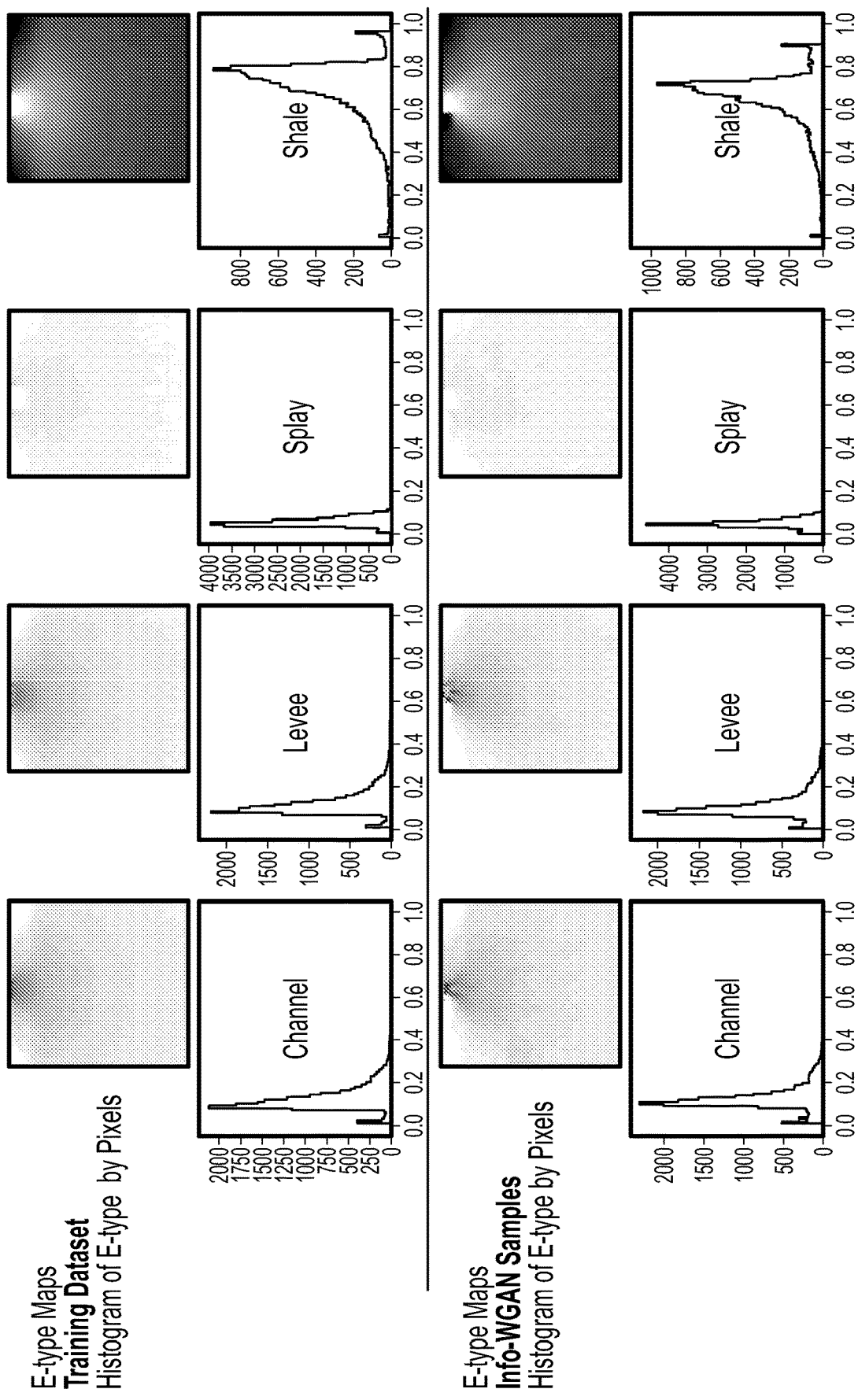
FIG. 12 depicts an e-type map (estimation type) constructed from the training images of deltaic deposition environments of FIG. 10, and a histogram of e-type for the pixels of the e-type map constructed from the training images.

Further testing of the e-type maps for each individual facies is displayed in FIG. 12. When computing the e-type for one specified sedimentary facies, an indicator transformation is applied, i.e. the corresponding studied facies is indicated as 1 and others as 0. The e-type map of a specified facies is then created by pixel-wise averaging of all the samples. In FIG. 12, one can observe that the e-type maps and their statistics for all the facies from the training images are reproduced quite well by the generator network of the Info-WGAN.

1.4 Case 4: Mixed 3 Types of Systems with Different Number of Facies

This case study tests the boundaries of the applicability of Info-WGAN. In this case study, all three types of sedimentary systems discussed above are merged into one big training dataset that contains 5000 binary fluvial images, 5000 binary deltaic images (called deltaic-I) and 5000 additional deltaic images with 4 facies (called deltaic-II). The facies coding is consistent in the mixed training images as 1 for channel, 2 for levee, 4 for splay and 0 for the background shale.

Figure 13A:
FIG. 13A depicts 100 samples (simulated images of geological facies) along with labels (Fluvial, Deltaic-1, Deltaic-2) for three-types of depositional environments (Binary Fluvial, Binary Deltaic, Deltaic with four facies) produced by the Info-WGAN.

The Info-WGAN with 3 latent categorical codes (labels) is used in this case study. FIG. 13A shows 100 samples (simulated images of geological facies) produced by the trained generator network of the Info-WAN. It demonstrates that the Info-WGAN can satisfactorily generate the mixed types of sedimentary systems with the correctly predicted labels and the ratio of each type from the training dataset (⅓ each in this case study) even though the training images have different number of facies.

Details of the Info-WGAN that generated the results for the mix of three types of sedimentary systems in FIG. 13A is shown in the table of FIG. 13B. Note that there are three networks in the table: generator, discriminator, and classifier. In this case, the single discriminator network D of FIG. 3 is logically partitioned into two parts: discriminator and classifier. Note that the discriminator and the classifier share the same base network that branches out into two dense layers with the size 128 towards the output layer, and then connects to two separate outputs, where the output of the discriminator provide the probability of the input image being training (real) versus simulated, and the output of the classifier providing a label for category type of the input image.

In this implementation, the generator and the base network of the discriminator and classifier is embodied by separate convolutional neural networks with strided convolutions. The generator employs batch normalization with LeakyReLU activation functions. The base network of the discriminator and classifier employs LeakyReLU and Dropout activation functions as well as LeakyReLU activation function with batch normalization. The LeakyReLU (0.2) and Dropout (0.4) activation functions were used in the networks. The networks were trained for 500 epochs with Adam and have a learning rate of r=2e-4, ft=0.5 and ft=0.9. The nonlinearity in the output layer of the generator is a sigmoid function.

When optimizing the z-vector in the latent space to honor the conditional data, we used the new gradient descent algorithm as described below in Equation 8 with a learning rate of r=1e−6 and the momentum parameter θ=0.999. We used the parameter A=1000, a weighting factor to balance the perceptual and contextual losses, and trained for 1500 iterations for generating each conditional simulation.

This confirms the advantages of Info-WGAN as a useful tool in generating diverse samples from the training dataset and producing equal probable realizations of facies models with the correct statistics.

1.5 Validation on the Accuracy of the Predicted Labels

Another advantage of the Info-WGAN over the original GANs lies in its prediction capability on the new images (facies models) since there is also a classifier as another output of the Info-WGAN in addition to the discriminator output that tells the probability of the generated images being real or fake. In this case study, after training of the Info-WGAN for the test dataset as discussed in the above section using 15000 mixed types of sedimentary systems with each type containing 5000 training images, 7000 testing images (fluvial: 2000, deltaic-I: 2000, deltaic-II: 3000), which were generated by OBM using the same statistics as those used for the training image creation, were applied as inputs to the trained discriminator network to test how good the discriminator network of the Info-WGAN can predict the labels of the training images.

Figure 14:
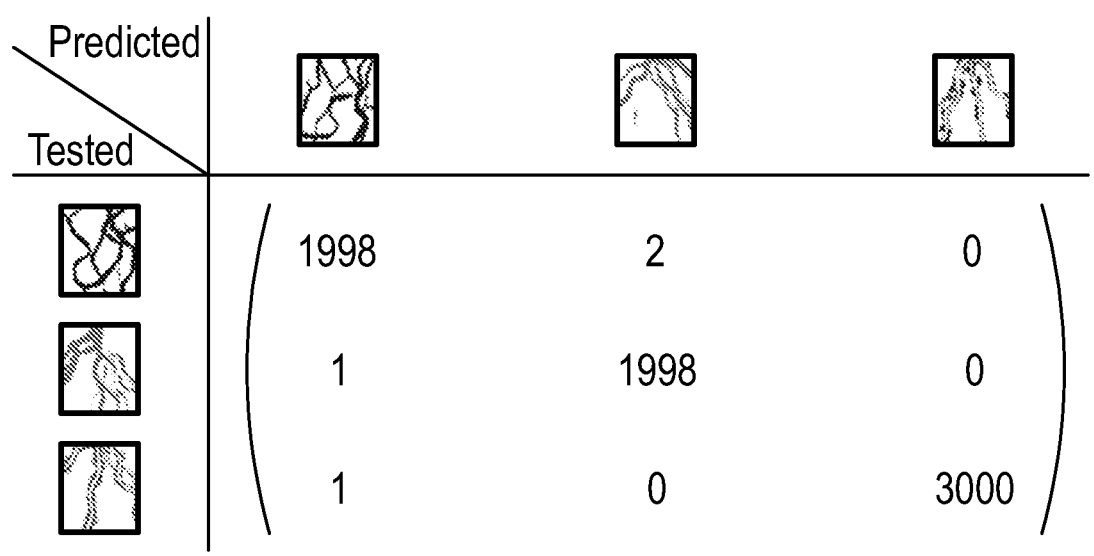
FIG. 14 depicts a classification accuracy matrix that shows the accuracy of the labels precited by the Info-WGAN for 7000 test images that contained 2000 images for fluvial depositional environments, 2000 images for binary deltaic depositional environments (Deltaic-I) and 3000 images for deltaic depositional environments with four facies (Deltaic-II)

FIG. 14 shows the classification accuracy matrix that tells the Info-WGAN predicts the labels of the 7000 testing images with the accuracy of 99.93% and only two fluvial images and two deltaic-I images were misclassified and all the 3000 deltaic-II images with 4 facies are correctly classified.

Conditioning the Samples Generated by Info-WGAN to Field Measurements

Generating geological facies models using GANs and constraining them by the well interpretations has been described by Dupont et al., "Generating realistic geology conditioned on physical measurements with generative adversarial networks," arXiv: 180203065, 2018. The well data conditioning can be accomplished using semantic inpainting after the training of GANs through the optimization of noisy Z-vector in the latent space by gradient descent with popularly used Adam optimization scheme. Details of the semantic imprinting scheme is described in Li et al., "Context-aware semantic inpainting," arXiv: 171207778, 2017, Pathak et al., "Context encoders: feature learning by in-painting," Proceedings of the IEEE conference on computer vision and pattern recognition, 2016, 2536-44, and Yeh et al., "Semantic image inpainting with perceptual and contextual losses," arXiv: 160707539, 2016.

However, because of the mode collapse and the resulting biased sampling in the original GANs, performing data conditioning tends to be very challenging once well data locations become denser, for example, in the case when there were more than 30 wells in the studied area. In contrast, the Info-WGAN makes it much easier to honor dense well locations thanks to the diversity and equal probability of the samples that the Info-WGAN generated.

Moreover, a novel scheme has been developed to optimize the Z-vector using stochastic gradient descent by normalizing the gradient vector into a unit vector, which is a practical and useful extension. More specifically, this new stochastic gradient descent scheme with normalized gradient descent is written as the following:

$$v_t = \beta v_{(t-1)} + r g_t$$

$$z_t = z_{(t-1)} - v_t \qquad \text{Eqn. (8)}$$

where Z is the noise vector in the latent space, r is the learning rate with a default value 0.006, $g_t$ is the normalized gradient, $\beta$ is the moment factor with default value 0.999, and t is the time step in the iteration process of the optimization.

To perform well data conditioning, the loss function in the optimization through error propagation over the latent noise Z-vector is designed to have two components: perceptual loss and contextual loss. While the perceptual loss penalizes unrealistic images, the contextual loss penalizes the mismatch between the generated samples and the interpreted facies at well locations.

The following will show tested cases for the well data conditioning by Info-WGAN with the new optimization scheme. It is worth noting that the data conditioning only uses the generator network of the trained Info-WGAN. That means, once the Info-WGAN has been trained for a training dataset, the data conditioning process can be done afterwards separately without the need to retrain the networks and this makes the generation of conditional samples by GANs very efficient, which is normally completed in seconds for one realization. As mentioned above, thanks to the Wasserstein distance along with the GP technique that avoids the problem of mode collapse, it is much easier to train Info-WGANs than the original GANs. The conditioning iteration ceases once the contextual loss is below an error threshold.

2.1 Case 1: Well Data Conditioning for Binary Fluvial Facies

Figure 15:
FIG. 15 depicts the spatial distribution of 30 wells (left-most plot), three samples of simulated images of a fluvial-type depositional environment produced by the Info-GAN with the noise vector input conditioned by well data from the 30 wells (three middle plots), and an e-type map (estimation type) constructed from the 100 samples of simulated images of the fluvial-type deposition environment produced by the Info-GAN with the noise vector input conditioned by well data from the 30 wells (right-most plot)
Figure 16:
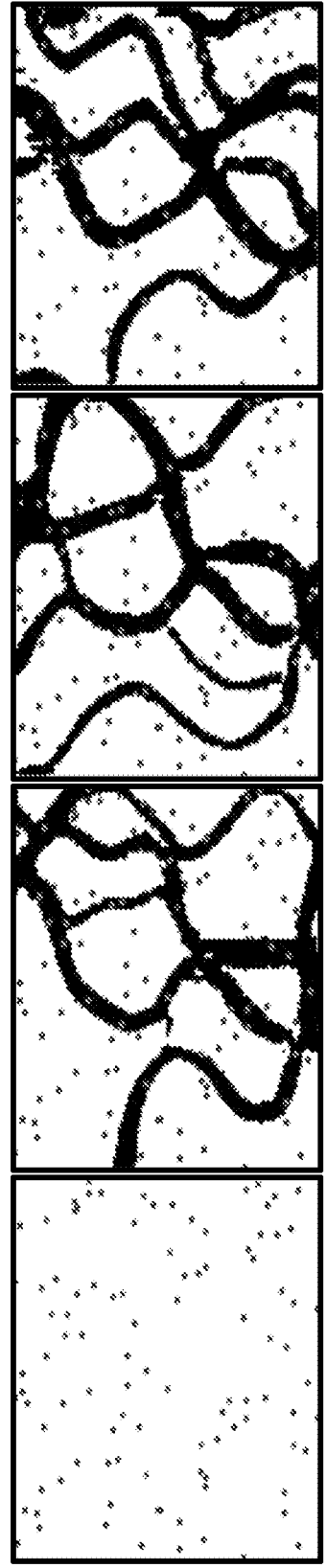
FIG. 16 depicts the spatial distribution of 100 wells (left-most plot) and three samples of simulated images of a fluvial-type depositional environment produced by the Info-GAN with the noise vector input conditioned by well data from the 100 wells (three plots)
Figure 17:
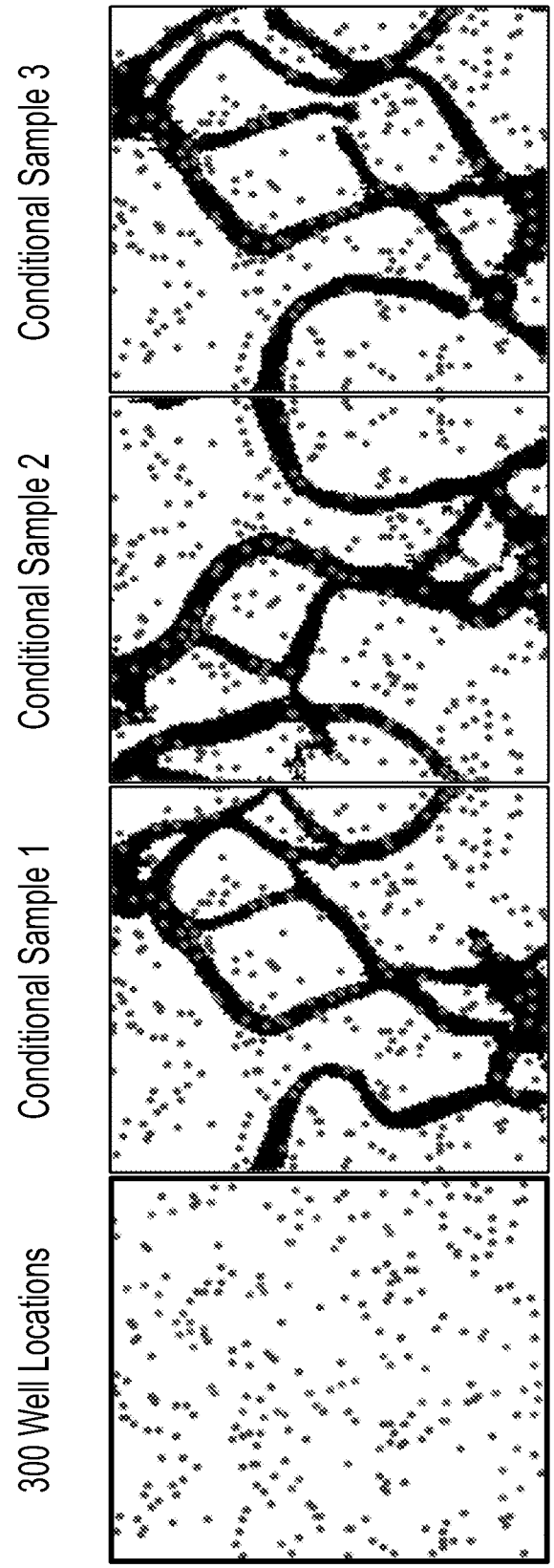
FIG. 17 depicts the spatial distribution of 300 wells (left-most plot) and three samples of simulated images of a fluvial-type depositional environment produced by the Info-GAN with the noise vector input conditioned by well data from the 300 wells (three plots)

FIGS. 15-17 display conditional samples using the pre-trained Info-WGAN that honor 30 wells, 100 wells and 300 wells, respectively. All the samples are constrained by the same set of well data and their differences indicate the uncertainty among the facies models at areas that are away from the known well locations. In FIG. 15, the top-right map is the conditional e-type map constrained by the 30 well locations (top-left), which is computed by averaging 100 conditional samples generated by the Info-WGAN. This map provides the sand probability after knowing the well interpretation at 30 locations.

2.2 Case 2: Data Conditioning for a Mix of Binary Fluvial and Deltaic Systems

Figure 18:
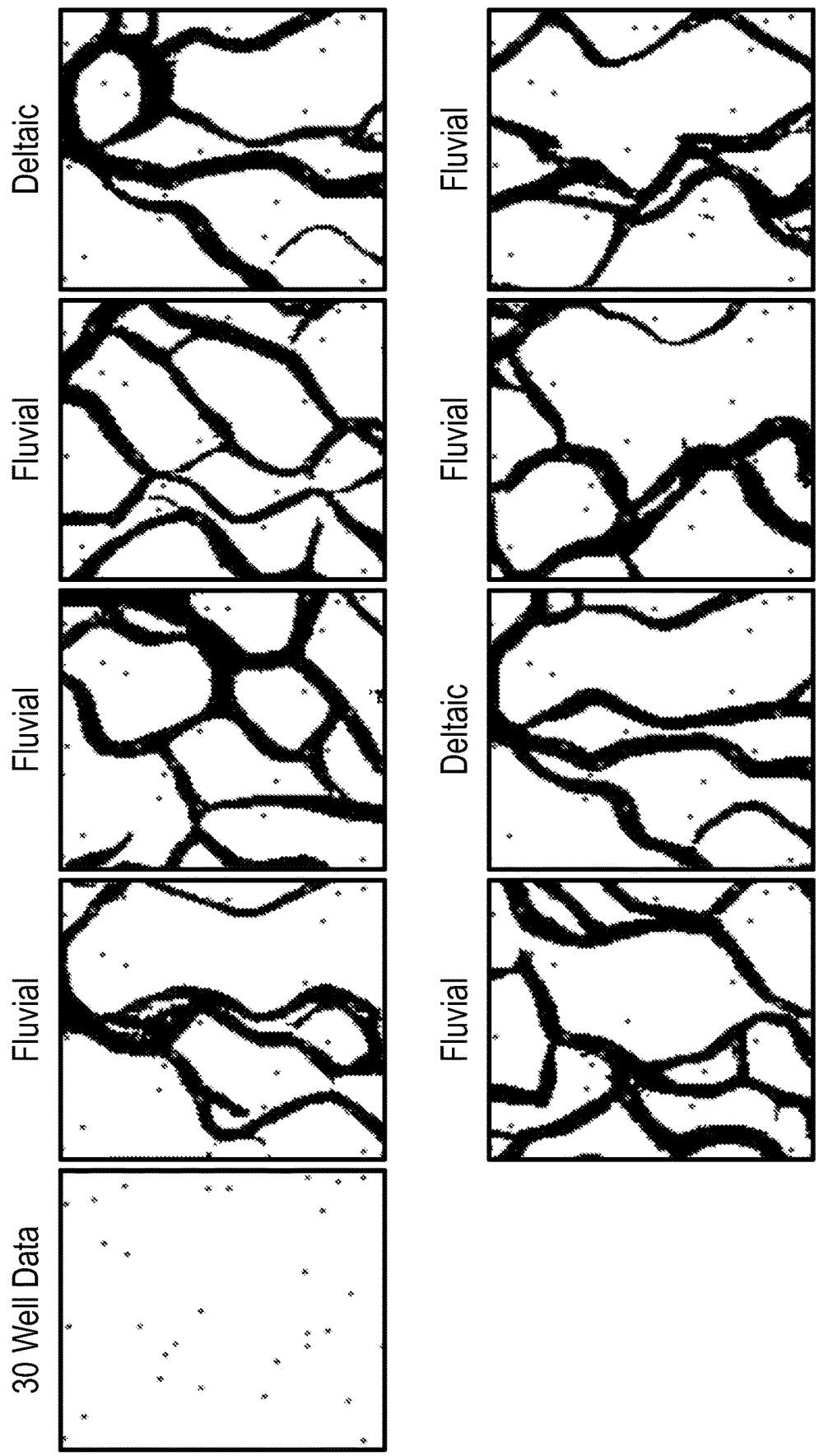
FIG. 18 depicts the spatial distribution of 30 wells (left-most plot) and eight samples of simulated images of mixed depositional environments produced by the Info-GAN with the noise vector input conditioned by well data from the 30 wells (eight plots); in this case, the mixed depositional environments includes both a binary fluvial type and a binary deltaic type.

FIG. 18 demonstrates the capability of Info-WGAN in generating conditional samples when the training dataset contains mixed depositional environments such as both binary fluvial and deltaic systems. The samples conditioning to 30 wells and contain both the fluvial and deltaic deposits with the correctly predicted labels and the correct mixing ratio of the fluvial and deltaic deposits.

2.3 Case 3: Well Data Conditioning for Multiple Facies

Figure 19:
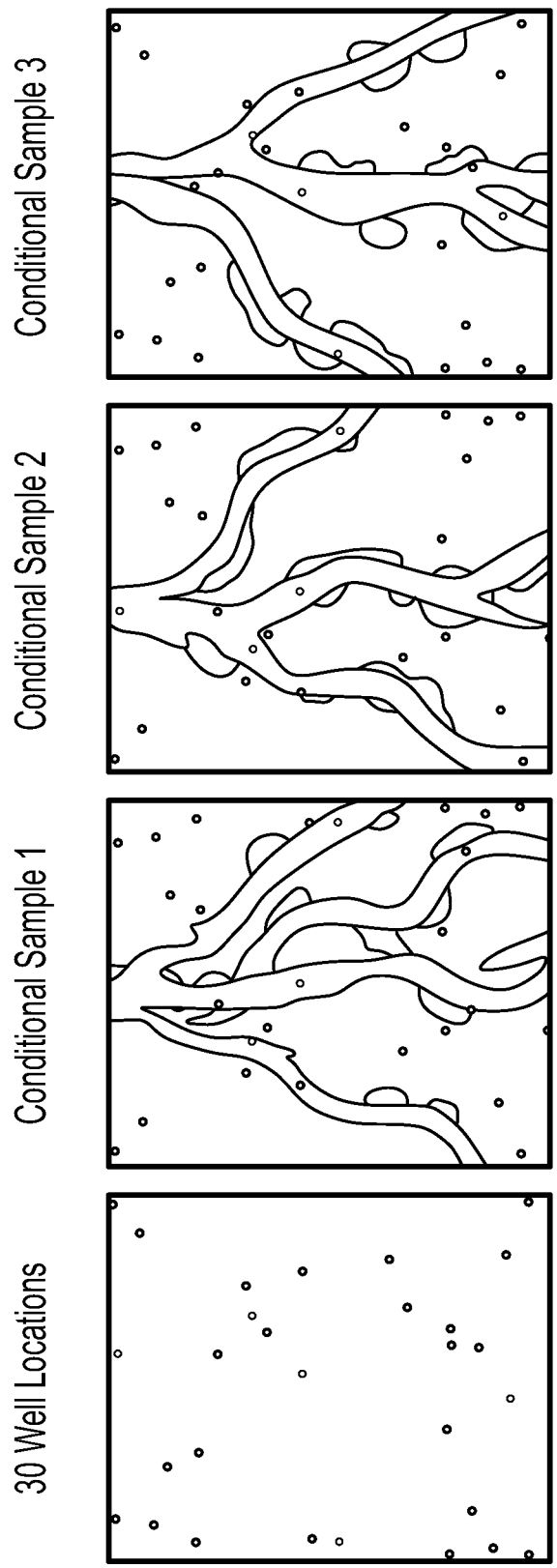
FIG. 19 depicts the spatial distribution of 30 wells (left-most plot) and three samples of simulated images of a depositional environment with multiple facies as produced by the Info-GAN with the noise vector input conditioned by well data from the 30 wells (three plots); in this case, the depositional environment is a fluvial environment with 4 facies (channel, levee, splay, shale (background))
Figure 20:
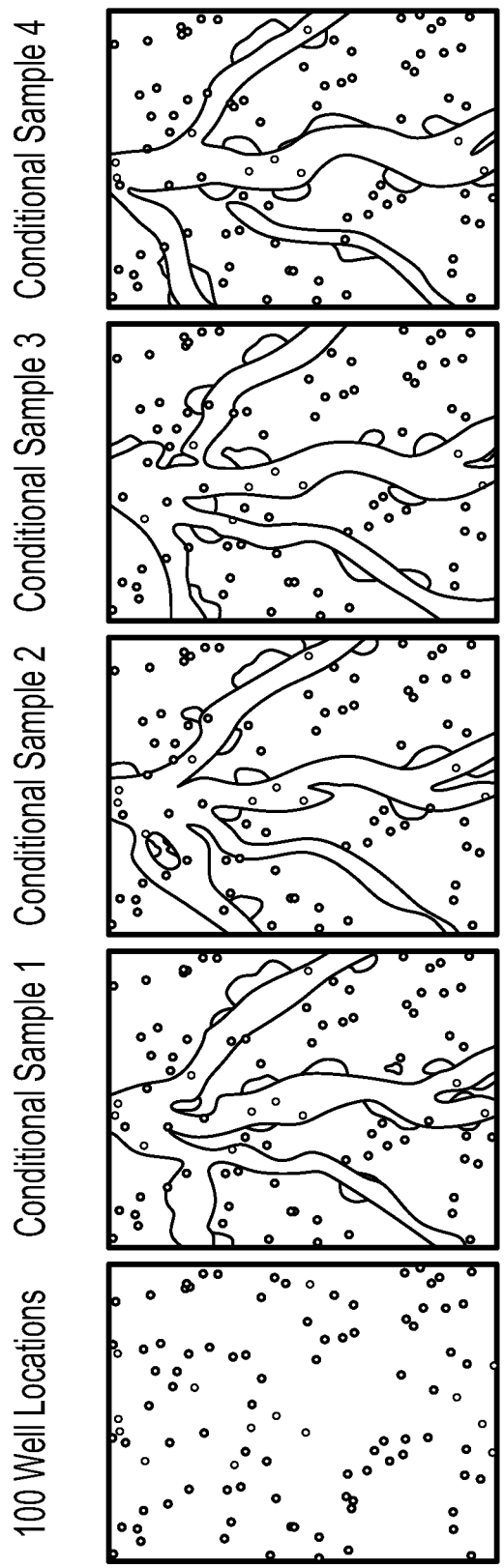
FIG. 20 depicts the spatial distribution of 100 wells (left-most plot) and four samples of simulated images of a depositional environment with multiple facies as produced by the Info-GAN with the noise vector input conditioned by well data from the 1000 wells (four plots); in this case, the depositional environment is a fluvial environment with 4 facies (channel, levee, splay, shale (background))

FIGS. 19-20 demonstrate the capability of Info-WGAN in generating conditional samples when the training images have multiple facies. There are 4 facies in this case study and the results show that Info-WGAN can generate realistic models with multiple facies and condition them to dense well locations.

The present disclosure applies a novel variant of the original GANs called Info-WGAN for generating subsurface geological models constrained by well data. Compared with the original GANs, Info-WGAN can generate more diverse samples with equal probable realizations, which the original GANs often fails to provide due to the mode collapse that further causes notorious difficulty in stabilizing the training of GANs.

By eliminating the hurdles on the diversity and ensuring a true representation of training data distribution, modeling geology using Info-WGAN is a practical and useful tool in addressing objective uncertainty and creating meaningful realizations with representative and equal probable statistics. Otherwise, the generated models by the conventional GANs would be very biased and cannot be trusted for further accurate prediction of the subsurface geology.

The demonstrated advantages of using Info-WGAN in generating equal probable and diverse geological models is also beneficial to other deep machine learning based applications using GANs that require more general representation and exact reproduction of the true data distribution from the training dataset. The workflow and the scheme for checking the statistics can be used to determine whether the deep learning networks in image generation and modeling are representative and can lead to legitimate results.

The following is a non-exhaustive list of the novel components embodied by the Info-WGAN described herein:
  (a) applying Info-WGAN to modeling geology that combines InfoGAN with labeled geologic sedimentary types and uses Wasserstein distance and gradient penalty to overcome mode collapse of GAN training;
  (b) samples (images of geological facies) generated by the trained Info-WGAN are unbiased and as diverse as in the training images, and therefore, they can be treated as equal probable realizations;
  (c) equal probable samples (images of geological facies) generated by the Info-WGAN allow objective uncertainty evaluation, and one of them is the e-type map that is computed by averaging all the equal probable samples to access the facies probability. These e-type maps are useful in assisting optimal decision making such as infill well drilling, reserve estimation, and the estimation of hydrocarbon flow pathways in reservoirs;
  (d) the latent code vector input to the generator network of the Info-WGAN can be used to generate new geological models and can be disentangled into two parts, in which one part can have interpretable physical meaning, like c=[0, 1] for fluvial and c=[1, 0] for deltaic, when the mutual information maximization regularization term is included in the loss function of the Info-WGAN;
  (e) by adding sedimentary types as categorical codes to the latent space in addition to the noise vector z, the Info-WGAN can generate the mixed types of sedimentary environments with the correct statistics without encountering mode collapse issues even though the training dataset contain images with different number of facies;
  (f) comparing the e-type maps between the training dataset and the samples by GANs allows the determination of whether the networks are generating unbiased models, and this can be confirmed and verified by the comparison of the histograms of the e-type maps in pixels; and
  (g) the diversity and equal probability of the samples (images of geological facies) generated by the trained Info-WGAN makes the process of the well data conditioning converges faster even for much denser well locations. This fast convergence is further boosted by a novel stochastic gradient descent scheme with momentum that uses normalization of gradient vectors.

Figure 21:
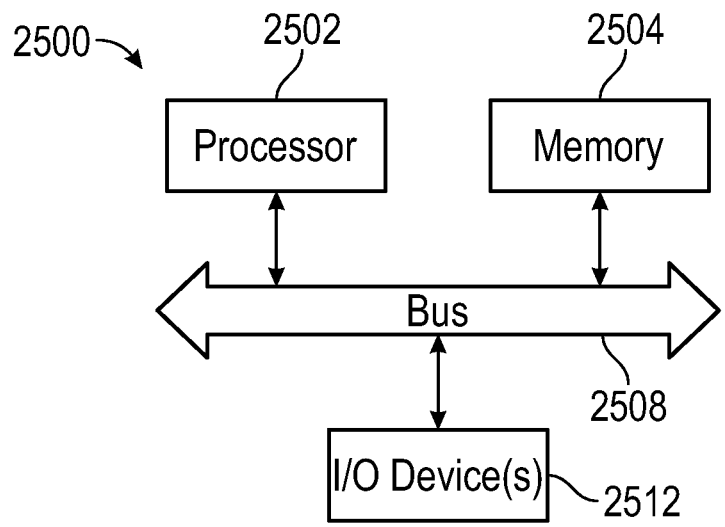
FIG. 21 is block diagram of a computer processing system.
Figure 21:
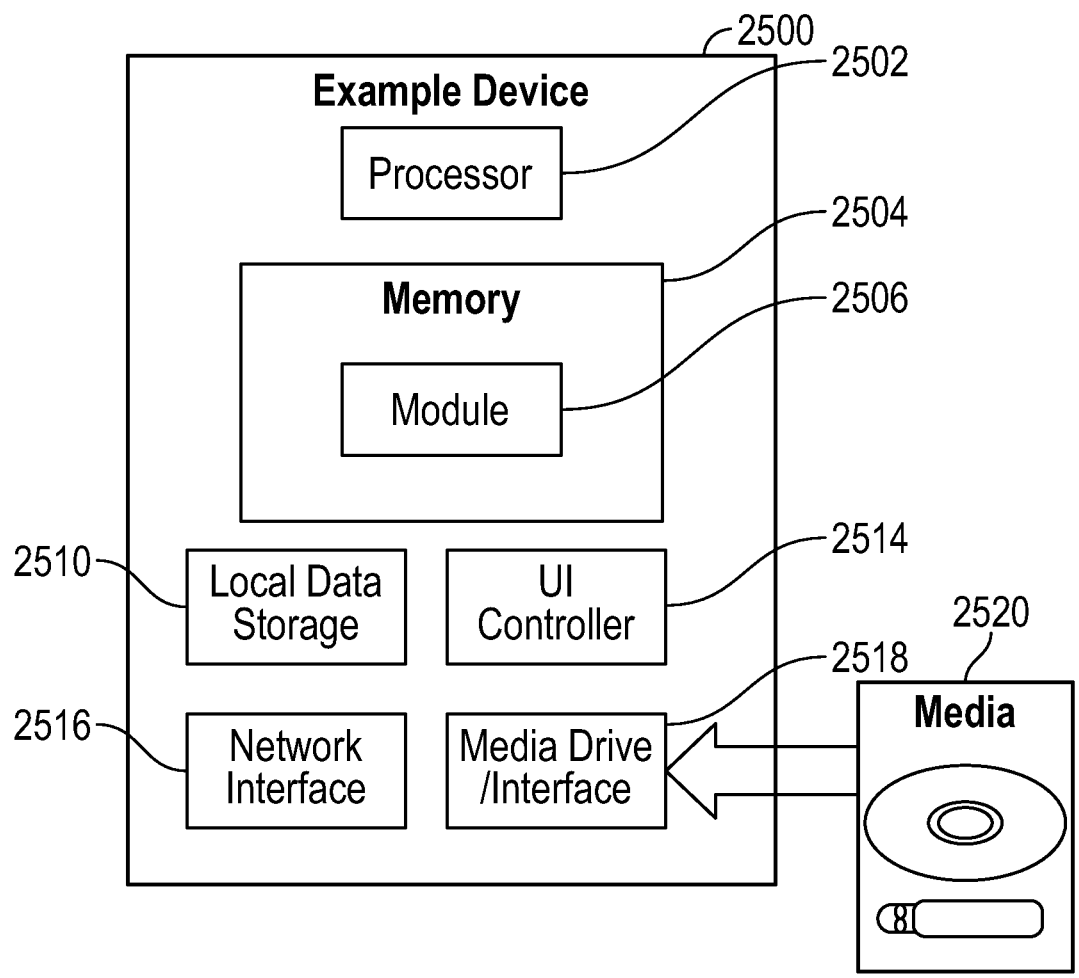

FIG. 21 illustrates an example device 2500, with a processor 2502 and memory 2504 that can be configured to implement various embodiments of the Info-WGAN and associated training methods and workflows as discussed in this disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A geological modeling system comprising:
    a generator neural network and a discriminator neural network, wherein at least one of the generator neural network and the discriminator neural network is realized by a processor, wherein, in a training phase, the generator neural network is trained to map a first combination of a first noise vector and a first category code vector as input to a simulated image of geological facies to obtain a trained generator neural network, and wherein the discriminator neural network is trained to map at least one image of geological facies provided as input to corresponding probability that the at least one image of geological facies provided as input is a training image of geological facies or a simulated image of geological facies produced by the generator neural network and to obtain a trained discriminator neural network, wherein, in an online phase, the trained generator neural network is configured to receive input data comprising a second combination of a second noise vector and a second category code vector, and to output a simulated image of geological facies, wherein the geological facies are defined by a texture, a mineralogy, a grain size, a depositional environment, or a combination thereof, and wherein each of the first and second category code vectors comprises an identification of a type of the depositional environment.

2. The geological modeling system of claim 1, wherein: the discriminator neural network is further trained to map the at least one image of geological facies provided as input to a label corresponding to a category of geological facies for the at least one image of geological facies.

3. The geological modeling system of claim 1, wherein: the discriminator neural network and the generator neural network are trained adversarially using an objective function in which the discriminator neural network aims to maximize reward by increasing the likelihood of correctly distinguishing training images of geological facies from simulated images of geological facies produced by the generator neural network, while the generator neural network attempts to reduce the likelihood that the simulated images of geological facies produced by the generator neural network are recognized as such by the discriminator neural network.

4. The geological modeling system of claim 3, wherein: the discriminator neural network is trained using both the simulated images of geological facies produced by the generator neural network and training images of geological facies that are suitable for geological models with labels for the first category code vectors for the training images.

5. The geological modeling system of claim 3, wherein: the training images of geological facies are generated by object-based modeling, geological process modeling or other tools.

6. The geological modeling system of claim 3, wherein: the objective function is based on Wasserstein distance between the training images of geological facies and the simulated images of geological facies produced by the generator neural network as well as a gradient penalty function that penalizes a gradient whose norm is away from one.

7. The geological modeling system of claim 3, wherein: the training images of geological facies and the simulated images of geological facies each comprise a two-dimensional image of pixels or a three-dimensional volume of voxels.

8. The geological modeling system of claim 7, wherein: the pixels or the voxels of the simulated images and the training images represent attributes of geological facies of a subterranean formation or portion thereof.

9. The geological modeling system of claim 8, wherein: the attributes of geological facies represented by the pixels or the voxels of the simulated images and the training images comprise rock-type.

10. The geological modeling system of claim 1, wherein: each of the first and second noise vectors is in a one-dimensional latent space, and each of the first and second category code vectors has specific values for different categories of geological facies represented by the simulated images produced by the generator neural network or the trained generator neural network.

11. The geological modeling system of claim 1, wherein: the generator neural network and the discriminator neural network each comprise a convolutional neural network.

12. The geological modeling system of claim 1, wherein the type of the depositional environment comprises one or more fluvial types, one or more deltaic types, or a combination thereof.

13. A method of geological modeling comprising:
in a training phase, training a generator neural network to map a first combination of a first noise vector and a first category code vector as input to a simulated image of geological facies to obtain a trained generator neural network, and training a discriminator neural network to map at least one image of geological facies provided as input to corresponding probability that the at least one image of geological facies provided as input is a training image of geological facies or a simulated image of geological facies produced by the generator neural network and to obtain a trained discriminator neural network;

in an online phase, supplying input data comprising a second combination of a second noise vector and a second category code vector to the trained generator neural network to output a simulated image of geological facies, wherein the geological facies are defined by a texture, a mineralogy, a grain size, a depositional environment, or a combination thereof, and wherein each of the first and second category code vectors comprises an identification of a type of the depositional environment.

14. The method of claim 13, further comprising:
repeating the operations of the online phase with input data having variation in the second noise vector to output a plurality of different simulated images of geological facies from the trained generator neural network.

15. The method of claim 14, wherein:
using the plurality of different simulated images of geological facies as equal probable images of geological facies.

16. The method of claim 13, further comprising:
repeating the operations of the online phase with input data having variation in the second category code vector to output a plurality of simulated images of different types of geological facies from the trained generator neural network.

17. The method of claim 13, wherein:
in the training phase, the discriminator neural network is trained to map at least one image of geological facies provided as input to a label corresponding to a category of geological facies for the at least one image of geological facies; and
in the online phase, supplying at least one simulated image of geological facies output from the trained generator neural network as input to the trained discriminator neural network to output a label corresponding to a category of geological facies for the at least one simulated image of geological facies.

18. The method of claim 13, wherein:
in the training phase, the discriminator neural network and the generator neural network are trained adversarially using an objective function in which the discriminator neural network aims to maximize reward by increasing the likelihood of correctly distinguishing training images of geological facies from simulated images of geological facies produced by the generator neural network, while the generator neural network attempts to reduce the likelihood that the simulated images of geological facies produced by the generator neural network are recognized as such by the discriminator neural network.

19. The method of claim 18, wherein:
in the training phase, the discriminator neural network is trained using both the simulated images of geological facies produced by the generator neural network and training images of geological facies that are suitable for geological models with labels for the first category code vectors for the training images.

20. The method of claim 18, wherein:
the training images of geological facies are generated by object-based modeling, geological process modeling or other tools.

* * * * *